(12) United States Patent  
Forster et al.

(10) Patent No.: US 7,373,713 B2  
(45) Date of Patent: May 20, 2008

(54) WAVE ANTENNA WIRELESS COMMUNICATION DEVICE AND METHOD

(75) Inventors: Ian J. Forster, Chelmsford (GB); Steven N. Terranova, Cary, NC (US)

(73) Assignee: Mineral Lassen LLC, Las Vegas, NV (US)

(*) Notice: Subject to any disclaimer, the term of this patent is extended or adjusted under 35 U.S.C. 154(b) by 0 days.

(21) Appl. No.: 11/468,750

(22) Filed: Aug. 30, 2006

(65) Prior Publication Data

US 2006/0290588 A1    Dec. 28, 2006

Related U.S. Application Data

(60) Division of application No. 10/356,815, filed on Feb. 3, 2003, now Pat. No. 7,190,319, which is a continuation-in-part of application No. 10/228,180, filed on Aug. 26, 2002, now Pat. No. 6,903,704, which is a continuation-in-part of application No. 10/012,206, filed on Oct. 29, 2001, now Pat. No. 6,630,910.

(51) Int. Cl.  
*H01Q 11/00* (2006.01)

(52) U.S. Cl. .................. 29/600; 343/806; 343/866; 343/895

(58) Field of Classification Search ................ 343/702, 343/795, 806, 866, 867, 895, 700 MS; 29/600  
See application file for complete search history.

(56) References Cited

U.S. PATENT DOCUMENTS 3,202,985 A    8/1965    Perkins  
3,508,274 A    4/1970    Kesler  
3,689,929 A *    9/1972    Moody ................... 343/802  
3,778,833 A    12/1973    Castrovillo  
4,250,509 A    2/1981    Collins (Continued)

FOREIGN PATENT DOCUMENTS

DE    3736803 A1    5/1989

(Continued)

OTHER PUBLICATIONS

English translation of Japanese Patent Office Official Action dated Oct. 15, 2007, Japanese Application No. 2004-567827.

*Primary Examiner*—Tho Phan  
(74) *Attorney, Agent, or Firm*—Christensen O'Connor Johnson Kindness PLLC

(57) ABSTRACT

A wireless communication device coupled to a wave antenna that provides greater increased durability and impedance matching. The wave antenna may be in the form of a polygonal, elliptical curve and/or coil shape. The wireless communication device is coupled to the wave antenna to provide wireless communication. The wireless communication device and wave antenna may be placed on objects, goods, or other articles of manufacture that are subject to forces such that the wave antenna may be stretched or compressed during the manufacture and/or use of such object, good or article of manufacture. The wave antenna, because of its curved structure, is capable of stretching and compressing more easily than other structures, reducing the wireless communication device's susceptibility to damage or breakage that might render the wireless communication device coupled to the wave antenna unable to properly communicate information wirelessly.

35 Claims, 32 Drawing Sheets

U.S. PATENT DOCUMENTS

| | | | |
|---|---|---|---|
| 4,520,365 A | 5/1985 | Langheck | |
| 4,529,961 A | 7/1985 | Nishimura | |
| 4,739,516 A | 4/1988 | Starkloff | |
| 4,864,322 A | 9/1989 | Yamamoto | |
| 4,866,456 A | 9/1989 | Ebey | |
| 5,181,975 A | 1/1993 | Pollack | |
| 5,218,861 A | 6/1993 | Brown | |
| 5,274,393 A | 12/1993 | Scott | |
| 5,319,354 A | 6/1994 | Myatt | |
| 5,347,280 A | 9/1994 | Schuermann | |
| 5,479,171 A | 12/1995 | Schuermann | |
| 5,554,242 A | 9/1996 | Brown | |
| 5,731,754 A | 3/1998 | Lee, Jr. | |
| 5,833,603 A | 11/1998 | Kovacs | |
| 5,926,107 A | 7/1999 | Glehr | |
| 5,959,524 A | 9/1999 | Wienand | |
| 5,961,215 A | 10/1999 | Lee | |
| 5,972,156 A | 10/1999 | Brady | |
| 6,016,127 A | 1/2000 | Casciola | |
| 6,023,250 A | 2/2000 | Cronyn | |
| 6,043,746 A | 3/2000 | Sorrells | |
| 6,087,930 A | 7/2000 | Kulka | |
| 6,097,347 A | 8/2000 | Duan | |
| 6,100,804 A | 8/2000 | Brady | |
| 6,104,349 A | 8/2000 | Cohen | |
| 6,127,989 A | 10/2000 | Kunz | |
| 6,130,602 A | 10/2000 | O'Toole | |
| 6,140,974 A | 10/2000 | Dalley | |
| 6,140,975 A | 10/2000 | Cohen | |
| 6,147,606 A | 11/2000 | Duan | |
| 6,198,442 B1 | 3/2001 | Rutkowski | |
| 6,208,244 B1 | 3/2001 | Wilson | |
| 6,257,289 B1 | 7/2001 | Tomita | |
| 6,265,977 B1 | 7/2001 | Vega | |
| 6,272,936 B1 | 8/2001 | Oreper | |
| 6,278,413 B1 | 8/2001 | Hugh | |
| 6,281,794 B1 | 8/2001 | Duan | |
| 6,285,342 B1 | 9/2001 | Brady | |
| 6,299,349 B1 | 10/2001 | Steinel | |
| 6,320,509 B1 | 11/2001 | Brady | |
| 6,320,545 B1 | 11/2001 | Nagumo | |
| 6,366,260 B1 | 4/2002 | Carrender | |
| 6,388,567 B1 | 5/2002 | Bohm | |
| 6,405,064 B1 | 6/2002 | Endo | |
| 6,417,489 B1 | 7/2002 | Blankenship | |
| 6,417,816 B2 | 7/2002 | Sadler | |
| 6,424,315 B1 | 7/2002 | Glenn | |
| 6,429,817 B1 | 8/2002 | Creigh | |
| 6,429,831 B2 | 8/2002 | Babb | |
| 6,448,942 B2 | 9/2002 | Weinberger | |
| 6,459,413 B1 | 10/2002 | Tseng | |
| 6,463,798 B2 | 10/2002 | Niekerk | |
| 6,474,380 B1 | 11/2002 | Rensel | |
| 6,480,110 B2 | 11/2002 | Lee | |
| 6,535,175 B2 * | 3/2003 | Brady et al. | 343/795 |
| 6,630,885 B2 | 10/2003 | Hardman | |
| 6,630,910 B2 | 10/2003 | Forster | |
| 6,666,080 B2 | 12/2003 | Buist | |
| 6,683,537 B2 | 1/2004 | Starkey | |
| 6,788,192 B2 | 9/2004 | Shimura | |
| 6,791,457 B2 | 9/2004 | Shimura | |
| 6,809,700 B2 | 10/2004 | Benedict | |
| 6,853,347 B2 | 2/2005 | Forster | |
| 6,856,285 B2 | 2/2005 | Bettin | |
| 6,870,506 B2 * | 3/2005 | Chen et al. | 343/700 MS |
| 6,895,655 B2 | 5/2005 | Forster | |
| 6,899,153 B1 | 5/2005 | Pollack | |
| 6,903,704 B2 | 6/2005 | Forster | |
| 6,999,028 B2 * | 2/2006 | Egbert | 343/700 MS |
| 7,019,695 B2 | 3/2006 | Cohen | |
| 7,021,132 B2 | 4/2006 | Nigon | |
| 7,050,017 B2 | 5/2006 | King | |
| 7,082,818 B2 | 8/2006 | Wilson | |
| 7,093,345 B2 | 8/2006 | Forster | |
| 7,116,213 B2 | 10/2006 | Thiesen | |
| 7,161,476 B2 | 1/2007 | Hardman | |
| 7,190,319 B2 | 3/2007 | Forster | |
| 7,256,751 B2 | 8/2007 | Cohen | |
| 2002/0116992 A1 | 8/2002 | Rickel | |
| 2002/0190852 A1 | 12/2002 | Lin | |
| 2004/0021559 A1 | 2/2004 | O'Brien | |
| 2004/0041739 A1 | 3/2004 | Forster | |
| 2006/0279425 A1 | 12/2006 | Forster | |

FOREIGN PATENT DOCUMENTS

| | | |
|---|---|---|
| DE | 10030402 A1 | 2/2002 |
| EP | 0884796 A2 | 12/1998 |
| EP | 1037755 B1 | 3/2002 |
| EP | 1177597 B1 | 7/2003 |
| JP | 1116899 U | 8/1989 |
| JP | 279602 A | 3/1990 |
| JP | 11154819 A | 6/1999 |
| JP | 2001525281 A | 12/2001 |
| JP | 2002503047 A | 1/2002 |
| JP | 200264329 A | 2/2002 |
| JP | 2003505962 A | 2/2003 |
| WO | 9929522 A1 | 6/1999 |
| WO | 9929525 A1 | 6/1999 |
| WO | 99040647 A1 | 8/1999 |
| WO | 9956345 A1 | 11/1999 |
| WO | 9967851 A1 | 12/1999 |
| WO | 0069016 A1 | 11/2000 |
| WO | 0108254 A1 | 2/2001 |
| WO | 0207085 A1 | 1/2002 |
| WO | 03038747 A2 | 5/2003 |
| WO | 2004070876 A1 | 8/2004 |

* cited by examiner

WAVE ANTENNA WIRELESS COMMUNICATION DEVICE AND METHOD

CROSS-REFERENCE TO RELATED APPLICATION

This application is a divisional of prior U.S. application Ser. No. 10/356,815, filed Feb. 3, 2003, which is a continuation-in-part of U.S. application Ser. No. 10/228,180, filed Aug. 26, 2002, now U.S. Pat. No. 6,903,704, which is a continuation-in-part of U.S. application Ser. No. 10/012,206, filed Oct. 29, 2001, now U.S. Pat. No. 6,630,910, priority from the filing dates of which is hereby claimed under 35 U.S.C. § 120.

FIELD OF THE INVENTION

The present invention relates to a wave antenna coupled to a wireless communication device so that the wireless communication device can wirelessly communicate information.

BACKGROUND OF THE INVENTION

Wireless communication devices are commonly used today to wirelessly communicate information about goods. For example, transponders may be attached to goods during their manufacture, transport and/or distribution to provide information, such as the good's identification number, expiration date, date of manufacture or "born on" date, lot number, and the like. The transponder allows this information to be obtained unobtrusively using wireless communication without slowing down the manufacturing, transportation, and/or distribution process.

Some goods involve environmental factors that are critical to their manufacture and/or intended operation. An example of such a good is a vehicle tire. It may be desirable to place a wireless communication device in a tire so that information regarding the tire, such as a tire's identification, pressure, temperature, and other environmental information, can be wirelessly communicated to an interrogation reader during the tire's manufacture and/or use.

Tire pressure monitoring may be particularly important since the pressure in a tire governs its proper operation and safety in use For example, too little pressure in a tire during its use can cause a tire to be damaged by the weight of a vehicle supported by the tire. Too much pressure can cause a tire to rupture. Tire pressure must be tested during the manufacturing process to ensure that the tire meets intended design specifications. The tire pressure should also be within a certain pressure limits during use in order to avoid dangerous conditions. Knowledge of the tire pressure during the operation of a vehicle can be used to inform an operator and/or vehicle system that a tire has a dangerous pressure condition. The vehicle may indicate a pressure condition by generating an alarm or warning signal to the operator of the vehicle During the manufacturing process of a tire, the rubber material comprising the vehicle tire is violently stretched before taking final shape. Wireless communication devices placed inside tires during their manufacture must be able to withstand this stretching and compression and still be able to operate properly after the completion of the tire's manufacture. Since wireless communication devices are typically radio-frequency communication devices, an antenna must be coupled to the wireless communication device for communication This antenna and wireless communication device combination may be placed in the inside of the tire along its inner wall or inside the rubber of the tire, for example. This results in stretching and compression of the wireless communication device and its antenna whenever the tire is stretched and compressed. Often, the antenna is stretched and subsequently damaged or broken, thereby either disconnecting the wireless communication device from an antenna or changing the length of the antenna, which changes the operating frequency of the antenna. In either case, the wireless communication device may be unable to communicate properly when the antenna is damaged or broken Therefore, an object of the present invention is to provide an antenna for a wireless communication device that can withstand a force, such as stretching or compression, and not be susceptible to damage or a break. In this manner, a high level of operability can be achieved with wireless communication devices coupled to antennas for applications where a force is placed on the antenna.

SUMMARY OF THE INVENTION

The present invention relates to a wave antenna that is coupled to a wireless communication device, such as a transponder, to wirelessly communicate information. The wave antenna is a conductor. The wave antenna may be shaped in the form of various different types of curvatures, including a polygonal shape, elliptical curvature, and a coil. Polygonal shapes include curvatures having three or more sides The wave antenna is capable of stretching when subjected to a force without being damaged. The wave antenna can also provide improved impedance matching capability between the antenna and a wireless communication device because of the reactive interaction between different sections of the antenna conductor In general, varying the characteristics of the conductor wire of the wave antenna, such as diameter, the angle of the curves or bends, the lengths of the sections formed by the curves or bends, the period, phase, and/or amplitude of the conductor, and the type of conductor wire, will modify the cross coupling and, hence, the impedance of the wave antenna.

In a first wave antenna embodiment, a wireless communication device is coupled to a single conductor wave antenna to form a monopole wave antenna. The wave antenna conductor may be shaped in the form of polygonal shape, elliptical curvature, or a coil.

In a second wave antenna embodiment, a wireless communication device is coupled to two conductor wave antennas to form a dipole wave antenna. The wave antenna conductor may be shaped in the form of polygonal shape, elliptical curvature, or a coil.

In a third wave antenna embodiment, a dipole wave antenna is comprised out of conductors having different sections having different lengths. The first section is coupled to the wireless communication device and forms a first antenna having a first operating frequency. The second section is coupled to the first section and forms a second antenna having a second operating frequency. The wireless communication device is capable of communicating at each of these two frequencies formed by the first antenna and the second antenna. The wave antenna conductor may be shaped in the form of polygonal shape, elliptical curvature, or a coil.

In a fourth wave antenna embodiment, a dipole wave antenna is comprised out of conductive sections having different amplitudes. A first section, having a first amplitude, is coupled to the wireless communication device and forms a first antenna having a first operating frequency. The second section, having a second amplitude different from the amplitude of the first section, is coupled to the first section to form a second antenna having a second operating frequency. The wireless communication device is capable of communicating at each of these two frequencies formed by the first antenna and the second antenna. Each pole of the wave antenna is symmetrical. The wave antenna conductor may be shaped in the form of polygonal shape, elliptical curvature, or a coil.

In a fifth wave antenna embodiment, an asymmetrical dipole wave antenna is comprised out of conductive sections having different amplitudes. A first conductor, having a first amplitude, is coupled to the wireless communication device to form one pole of the dipole wave antenna. The second conductor, having a second amplitude different from the amplitude of the first pole, is coupled to the wireless communication device to form the second pole of the dipole wave antenna. The wave antenna conductor may be shaped in the form of polygonal shape, elliptical curvature, or a coil.

In a sixth wave antenna embodiment, an asymmetrical dipole wave antenna is comprised out of conductive sections having different lengths. A first conductor, having a first length, is coupled to the wireless communication device to form one pole of the dipole wave antenna. The second conductor, having a second length different from the length of the first pole, is coupled to the wireless communication device to form the second pole of the dipole wave antenna. The wave antenna conductor may be shaped in the form of polygonal shape, elliptical curvature, or a coil.

In a seventh wave antenna embodiment, a resonating conductor is additionally coupled to the wireless communication device to provide a second antenna operating at a second operating frequency. The resonating ring may also act as a stress relief for force placed on the wave antenna so that such force is not placed on the wireless communication device. The wave antenna conductor may be shaped in the form of polygonal shape, elliptical curvature, or a coil.

In another embodiment, the wireless communication device is coupled to a wave antenna and is placed inside a tire so that information can be wirelessly communicated from the tire to an interrogation reader. The wave antenna is capable of stretching and compressing, without being damaged, as the tire is stretched and compressed during its manufacture and pressurization during use on a vehicle. The wave antenna conductor may be shaped in the form of polygonal shape, elliptical curvature, or a coil.

In another embodiment, the interrogation reader determines the pressure inside a tire by the response from a wireless communication device coupled to a wave antenna placed inside the tire. When the tire and, therefore, the wave antenna stretch to a certain length indicative that the tire is at a certain threshold pressure, the length of the antenna will be at the operating frequency of the interrogation reader so that the wireless communication device is capable of responding to the interrogation reader. The wave antenna conductor may be shaped in the form of polygonal shape, elliptical curvature, or a coil.

In another embodiment, a method of manufacture is disclosed on one method of manufacturing the wave antenna out of a straight conductor and attaching wireless communication devices to the wave antenna. The uncut string of wireless communication devices and wave antennas form one continuous strip that can be wound on a reel and later unwound, cut and applied to a good, object, or article of manufacture. The wave antenna conductor may be shaped in the form of polygonal shape, elliptical curvature, or a coil Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The present invention relates to a wave antenna that is coupled to a wireless communication device, such as a transponder, to wirelessly communicate information. The wave antenna may be a conductor shaped in the form of a polygonal shape, elliptical curvature, or a coil This patent application is a continuation-in-part application of application Ser. No. 10/228,180 entitled "Wave Antenna Wireless Communication Device and Method," filed on Aug. 26, 2002, which is a continuation-in-part application of application Ser. No. 10/012,206 entitled "Wave Antenna Wireless Communication Device and Method," filed on Oct. 29, 2001, both of which are incorporated herein by reference in their entireties. The present application claims the benefit of both application Ser. Nos. 10/228,180 and 10/012,206.

A wave antenna has bends or curves that allow stretching or compressing of the conductor comprising the antenna without being damaged when subjected to a force A wave antenna can also provide improved impedance matching capability between the antenna and a wireless communication device because of the reactive interaction between different sections of the antenna conductor. In general, varying the characteristics of the conductor wire of the wave antenna, such as the diameter, the angle of the bends or curves, the lengths of the sections formed by the bends or curves, and the type of conductor wire, will modify the cross coupling and, hence, the impedance of the wave antenna.

Before discussing the particular aspects and applications of the wave antenna as illustrated in FIGS. 2–12 of this application, a wireless communication system that may be used with the present invention is discussed below.

Figure 1:
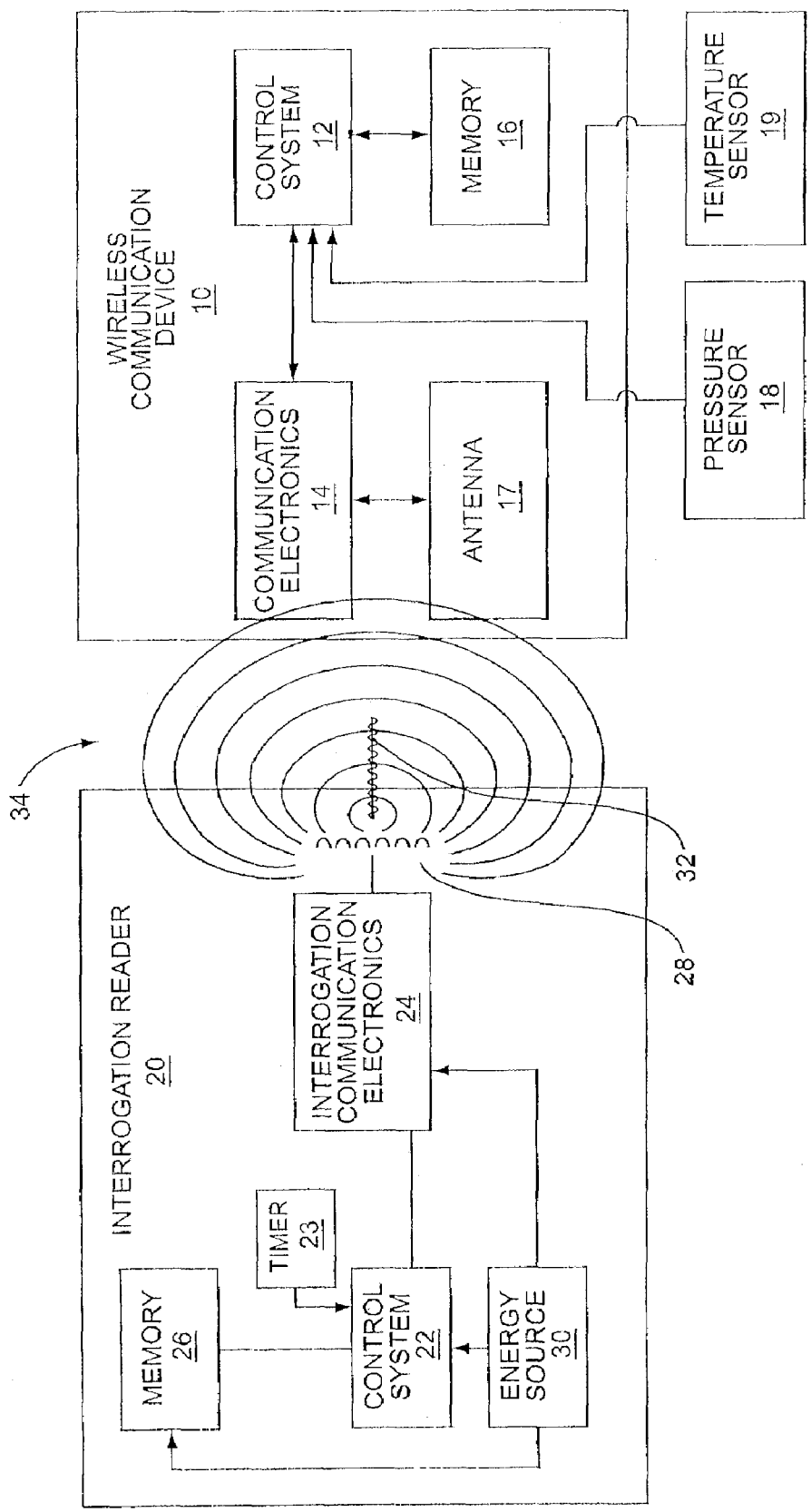
FIG. 1 is a schematic diagram of an interrogation reader and wireless communication device system that may be used with the present invention.

FIG. 1 illustrates a wireless communication device and communication system that may be used with the present invention. The wireless communication device 10 is capable of communicating information wirelessly and may include a control system 12, communication electronics 14, and memory 16. The wireless communication device 10 may also be known as a radio-frequency identification device (RFID). The communication electronics 14 is coupled to an antenna 17 for wirelessly communicating information in radio-frequency signals. The communication electronics 14 is capable of receiving modulated radio-frequency signals through the antenna 17 and demodulating these signals into information passed to the control system 12. The antenna 17 may be any type of antenna, including but not limited to a pole or slot antenna. The antenna 17 may be internal or external to the wireless communication device 10.

The control system 12 may be any type of circuitry or processor that receives and processes information received by the communication electronics 14, including a microcontroller or microprocessor. The wireless communication device 10 may also contain a memory 16 for storage of information. Such information may be any type of information about goods, objects, or articles of manufacture, including but not limited to identification, tracking, environmental information, such as pressure and temperature, and other pertinent information. The memory 16 may be electronic memory, such as random access memory (RAM), read-only memory (ROM), flash memory, diode, etc., or the memory 16 may be mechanical memory, such as a switch, dipswitch, etc.

The control system 12 may also be coupled to sensors that sense environmental information concerning the wireless communication device 10. For instance, the control system 12 may be coupled to a pressure sensor 18 to sense the pressure on the wireless communication device 10 and/or its surroundings. The control system 12 may also be coupled to a temperature sensor 19 to sense the temperature of the wireless communication device 10 or the ambient temperature around the wireless communication device 10. More information on different types of pressure sensors 18 that can be used to couple to the control system are disclosed in U.S. Pat. Nos. 6,299,349 and 6,272,936, entitled "Pressure and temperature sensor" and "Pressure sensor," respectively, both of which are incorporated herein by reference in their entirety.

The temperature sensor 19 may be contained within the wireless communication device 10, or external to the wireless communication device 10. The temperature sensor 19 may be any variety of temperature sensing elements, such as a thermistor or chemical device. One such temperature sensor 19 is described in U.S. Pat. No. 5,959,524, entitled "Temperature sensor," incorporated herein by reference in its entirety. The temperature sensor 19 may also be incorporated into the wireless communication device 10 or its control system 12, like that described in U.S. Pat. No. 5,961,215, entitled "Temperature sensor integral with microprocessor and methods of using same," incorporated herein by reference in its entirety. However, note that the present invention is not limited to any particular type of temperature sensor 19.

Some wireless communication devices 10 are termed "active" devices in that they receive and transmit data using their own energy source coupled to the wireless communication device 10. A wireless communication device 10 may use a battery for power as described in U.S. Pat. No. 6,130,602 entitled "Radio frequency data communications device," or may use other forms of energy, such as a capacitor as described in U.S. Pat. No. 5,833,603, entitled "Implantable biosensing transponder." Both of the preceding patents are incorporated herein by reference in their entirety Other wireless communication devices 10 are termed "passive" devices meaning that they do not actively transmit and therefore may not include their own energy source for power. One type of passive wireless communication device 10 is known as a "transponder." A transponder effectively transmits information by reflecting back a received signal from an external communication device, such as an interrogation reader. An example of a transponder is disclosed in U.S. Pat. No. 5,347,280, entitled "Frequency diversity transponder arrangement," incorporated herein by reference in its entirety. Another example of a transponder is described in co-pending U.S. patent application Ser. No. 09/678,271, entitled "Wireless communication device and method," incorporated herein by reference in its entirety.

FIG. 1 depicts communication between a wireless communication device 10 and an interrogation reader 20. The interrogation reader 20 may include a control system 22, an interrogation communication electronics 24, memory 26, and an interrogation antenna 28. The interrogation antenna 28 may be any type of antenna, including a pole antenna or a slot antenna. The interrogation reader 20 may also contain its own internal energy source 30, or the interrogation reader 20 may be powered through an external power source. The energy source 30 may include batteries, a capacitor, solar cell or other medium that contains energy. The energy source 30 may also be rechargeable. A timer 23 may also be coupled to the control system 22 for performing tasks that require timing operations.

The interrogation reader 20 communicates with the wireless communication device 10 by emitting an electronic signal 32 modulated by the interrogation communication electronics 24 through the interrogation antenna 28. The interrogation antenna 28 may be any type of antenna that can radiate a signal 32 through a field 34 so that a reception device, such as a wireless communication device 10, can receive such signal 32 through its own antenna 17. The field 34 may be electromagnetic, magnetic, or electric. The signal 32 may be a message containing information and/or a specific request for the wireless communication device 10 to perform a task or communicate back information. When the antenna 17 is in the presence of the field 34 emitted by the interrogation reader 20, the communication electronics 14 are energized by the energy in the signal 32, thereby energizing the wireless communication device 10. The wireless communication device 10 remains energized so long as its antenna 17 is in the field 34 of the interrogation reader 20. The communication electronics 14 demodulates the signal 32 and sends the message containing information and/or request to the control system 12 for appropriate actions.

It is readily understood to one of ordinary skill in the art that there are many other types of wireless communication devices and communication techniques than those described herein, and the present invention is not limited to a particular type of wireless communication device, technique or method.

Figure 2A:
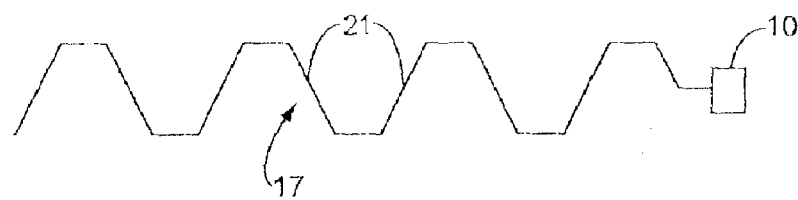
FIG. 2A is a schematic diagram of a monopole hexagonal-shaped wave antenna coupled to a wireless communication device for wireless communications.

FIG. 2A illustrates a first embodiment of a wave antenna 17 coupled to a wireless communication device 10 for wireless communication. This embodiment illustrates a monopole hexagonal-shaped wave antenna 17. A hexagonal-shaped wave antenna 17 is one form of a polygonal-shaped wave antenna. A polygonal-shaped wave antenna is a plane figure with a number of sides should the antenna not reverse its direction to form a repeating pattern. In a regular polygon all the sides and internal angles are equal. For such a polygon with n sides, the interior angle is (180–360/n) degrees and the sum of the interior angles is (180n–360) degrees. In this present invention, the polygonal shapes described may be normal or not normal Examples of polygonal-shapes are a square, a pentagon, a hexagon, a heptagon, an octagon, a nonagon, and a decagon, which are 4, 5, 6, 7, 8, 9 and 10-sided shapes respectively. In the present invention, the polygonal-shaped wave antennas are open such that approximately one half of the figure is above the x-axis center line of the antenna 17, and the other half is included below the x-axis center line of the antenna 17 so that the shape repeats in opposing fashion so that the antenna is not shorted. If the lower and upper portions of the wave antenna were superimposed on each other, a polygonal-shape figure would result.

The hexagonal-shaped wave antenna 17 is formed by a conducting material, such as a wire or foil for example, that is in the shape of a hexagon. The hexagonal-shaped sections form a series of peaks and valleys in the conductor. Any type of material can be used to form the hexagonal-shaped wave antenna 17 so long as the material can conduct electrical energy, including but not limited to copper, brass, steel, zinc-plated steel, spring brass, and brass coated spring steel The monopole hexagonal-shaped wave antenna 17 illustrated in FIG. 2A is coupled, by either a direct or reactive coupling, to an input port (not shown) on the wireless communication device 10 to provide an antenna 17 for wireless communications. Since the wireless communication device 10 contains another input port that is coupled to the monopole hexagonal-shaped wave antenna 17, this additional input port is grounded.

A wave antenna 17 may be particularly advantageous to use with a wireless communication device 10 in lieu of a straight antenna. One advantage of a wave antenna 17 is that it is tolerant to stretching without substantial risk of damage or breakage to the conductor. Certain types of goods, objects, or articles of manufacture may encounter a force, such as stretching or compression, during their manufacture and/or normal use. If a wireless communication device 10 uses a straight conductor as antenna 17 and is attached to goods, objects, or articles of manufacture that are subjected to a force during their manufacture or use, the antenna 17 may be damaged or broken when the good, object or article of manufacture is subjected to such force. If the antenna 17 is damaged or broken, this may cause the wireless communication device 10 to be incapable of wireless communication since a change in the length or shape of the conductor in the antenna 17 may change the operating frequency of the antenna 17.

A wave antenna 17, because of its bent sections 21, also causes the field emitted by the conductors in sections 21 to capacitively couple to other sections 21 of the wave antenna 17. This results in improved impedance matching with the wireless communication device 10 to provide greater and more efficient energy transfer between the wireless communication device 10 and the wave antenna 17. As is well known to one of ordinary skill in the art, the most efficient energy transfer occurs between a wireless communication device 10 and an antenna 17 when the impedance of the antenna 17 is the complex conjugate of the impedance of the wireless communication device 10

The impedance of a straight conductor antenna 17 is dependant on the type, size, and shape of the conductor The length of the antenna 17 is the primary variable that determines the operating frequency of the antenna 17. A wave antenna 17 can be varied in other ways not possible in a straight conductor antenna. In a wave antenna 17, other variables exist in the design of the antenna in addition to the type, size, shape and length of the conductor. The impedance of a wave antenna 17 can also be varied by varying the length of the individual sections 21 of the conductor making up the wave antenna 17, the angle between these individual sections 21, and the phase, period, and amplitude of the sections 21, in addition to the traditional variables available in straight conductor antennas. These additional variables available in wave antennas 17 can be varied while maintaining the overall length of the conductor so that the operating frequency of the wave antenna 17 is maintained. In this embodiment, the lengths of the individual sections 21 and the angles between the individual sections 21 are the same; however, they do not have to be.

It may be beneficial to selectively heat parts of the conductive wire that forms the wave antenna 17 to reduce the stress in the wave antenna 17 to prevent breakage. This could be done in a number of ways including but not limited to gas jets, clamps, or conductive clamps passing a high current through areas of the wave antenna 17.

In summary, a wave antenna 17 provides the ability to alter and select additional variables not possible in straight conductor antennas 17 that affect the impedance of the antenna 17, thereby creating a greater likelihood that the wave antenna's 17 impedance can be designed to more closely match the impedance of the wireless communication device 10. Of course, as is well known by one of ordinary skill in the art, the type of materials attached to the wave antenna 17 and the materials' dielectric properties also vary the impedance and operating frequency of the wave antenna 17. These additional variables should also be taken into account in the final design of the wave antenna 17. The reactive cross-coupling that occurs between different sections 21 of the wave antenna 17 also contribute to greater impedance matching capability of the wave antenna 17 to a wireless communication device 10. More information on impedance matching between a wireless communication device 10 and an antenna 17 for efficient transfer of energy is disclosed in U.S. pending patent application Ser. No. 09/536,334, entitled "Remote communication using slot antenna," incorporated herein by reference in its entirety.

Figure 2B:
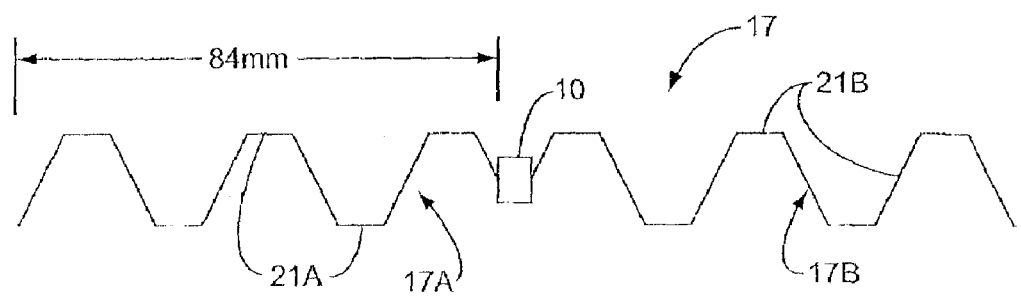
FIG. 2B is a schematic diagram of a dipole hexagonal-shaped wave antenna coupled to a wireless communication device for wireless communications.

FIG. 2B illustrates a hexagonal-shaped wave antenna 17 similar to that illustrated in FIG. 2A; however, the hexagonal-shaped wave antenna in FIG. 2B is a dipole hexagonal-shaped wave antenna 17. Two conductors 17A, 17B are coupled to the wireless communication device 10 to provide wireless communications. In this embodiment, the length of the conductors 17A, 17B that form the dipole hexagonal-shaped wave antenna 17 are each 84 millimeters in length. The dipole hexagonal-shaped wave antenna 17 operates at a frequency of 915 MHz. In this embodiment, the lengths of the individual sections 21 and the angles between the individual sections 21 that make up the dipole hexagonal-shaped wave antenna 17 are the same; however, they do not have to be.

Figure 2C:
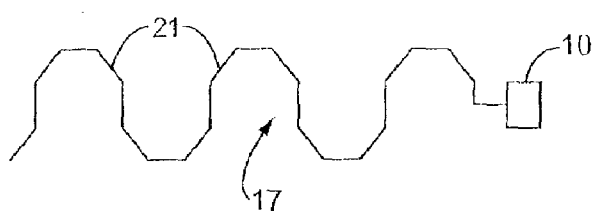
FIG. 2C is a schematic diagram of a monopole octagonal-shaped wave antenna coupled to a wireless communication device for wireless communications.

FIG. 2C illustrates an alternative embodiment of FIG. 2A, except that the wave antenna 17 comprises octagonal-shaped sections 21. All other aspects of the octagonal-shaped wave antenna 17 embodiment discussed above and illustrated in FIG. 2A are equally applicable for this embodiment.

Figure 2D:
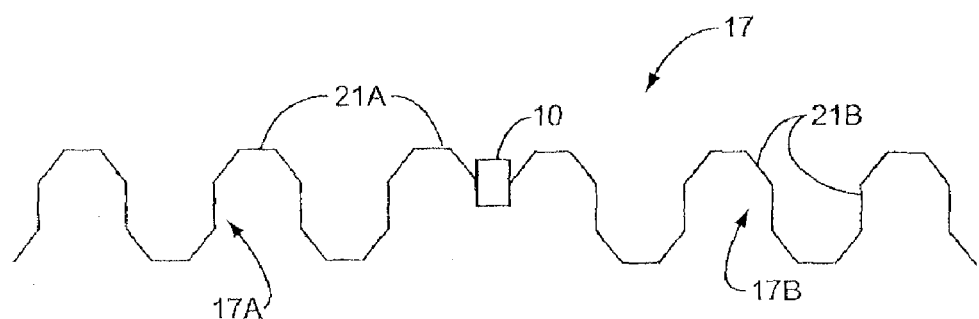
FIG. 2D is a schematic diagram of a dipole octagonal-shaped wave antenna coupled to a wireless communication device for wireless communications.
Figure 2E:
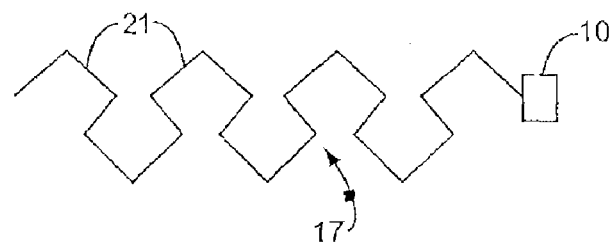
FIG. 2E is a schematic diagram of a monopole pentagonal-shaped wave antenna coupled to a wireless communication device for wireless communications.
Figure 2F:
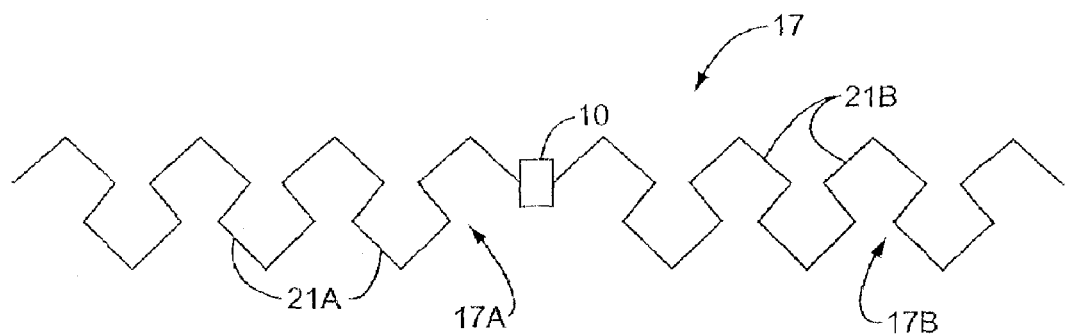
FIG. 2F is a schematic diagram of a dipole pentagonal-shaped wave antenna coupled to a wireless communication device for wireless communications.

FIG. 2D illustrates an alternative embodiment of FIG. 2B, except that the wave antenna 17 is comprised of sections 21 that are octagonal-shaped. All other aspects of the hexagonal-shaped wave antenna 17 embodiment discussed above and illustrated in FIG. 2B are equally applicable for this embodiment FIG. 2E illustrates an alternative embodiment of FIG. 2A, except that the wave antenna 17 comprises pentagonal-shaped sections 21. All other aspects for the pentagonal-shaped wave antenna 17 embodiment discussed above and illustrated in FIG. 2A are equally applicable for this embodiment FIG. 2F illustrates an alternative embodiment of FIG. 2B, except that the wave antenna 17 is comprised of sections 21 that are pentagonal-shaped. All other aspects for the pentagonal-shaped wave antenna 17 embodiment discussed above and illustrated in FIG. 2B are equally applicable for this embodiment.

Figure 2G:
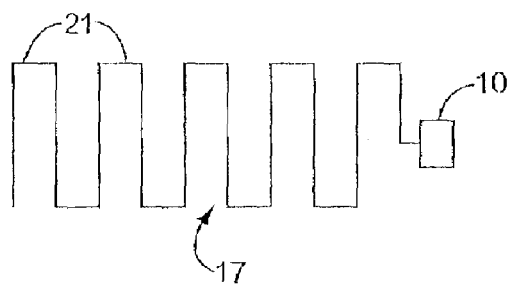
FIG. 2G is a schematic diagram of a monopole square-shaped wave antenna coupled to a wireless communication device for wireless communications.

FIG. 2G illustrates an alternative embodiment of FIG. 2A, except that the wave antenna 17 comprises square-shaped sections 21. All other aspects for the square-shaped wave antenna 17 embodiment discussed above and illustrated in FIG. 2A are equally applicable for this embodiment.

Figure 2H:
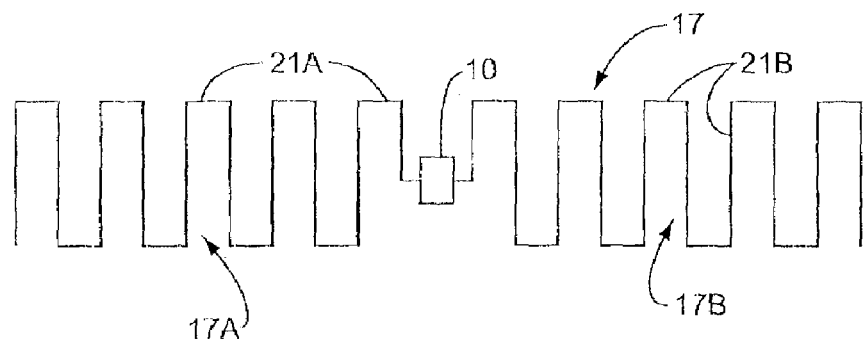
FIG. 2H is a schematic diagram of a dipole square-shaped wave antenna coupled to a wireless communication device for wireless communications.

FIG. 2H illustrates an alternative embodiment of FIG. 2B, except that the wave antenna 17 is comprised of sections 21 that are square-shaped. All other aspects for the square-shaped wave antenna 17 embodiment discussed above and illustrated in FIG. 2B are equally applicable for this embodiment.

Figure 2I:
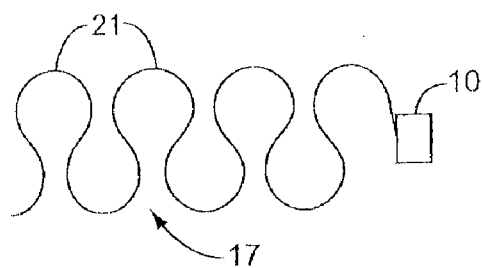
FIG. 2I is a schematic diagram of a monopole elliptical curve-shaped wave antenna coupled to a wireless communication device for wireless communications.
Figure 2J:
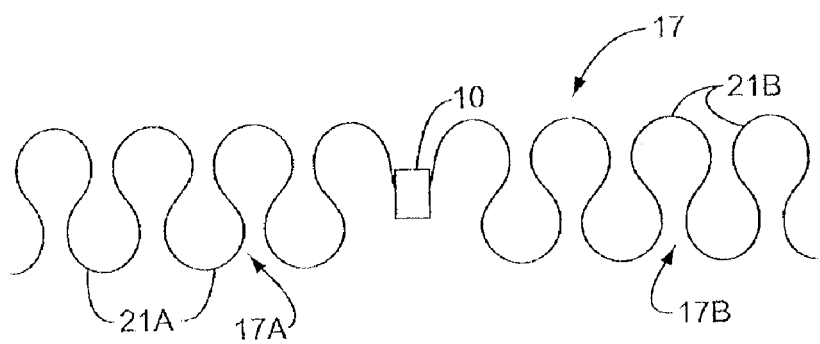
FIG. 2J is a schematic diagram of a dipole elliptical curve-shaped wave antenna coupled to a wireless communication device for wireless communications.

FIG. 2I illustrates an alternative embodiment of FIG. 2A, except that the wave antenna 17 comprises elliptical-curved sections 21. The wave antenna 17 is comprised of a series of alternating elliptical curves. The elliptical curves reverse in direction in an alternating and periodic pattern The elliptical curves may be irregular curves meaning that they are uniform in angle FIG. 2J illustrates an alternative embodiment of FIG. 2I, except that the wave antenna 17 is a dipole antenna. All other aspects for the elliptical curve-shaped wave antenna 17 embodiment discussed above and illustrated in FIG. 2I are equally applicable for this embodiment.

Figure 2K:
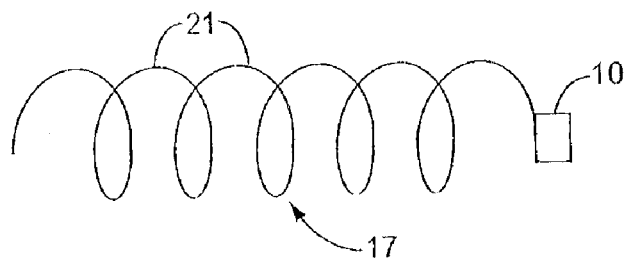
FIG. 2K is a schematic diagram of a monopole coil-shaped wave antenna coupled to a wireless communication device for wireless communications.
Figure 2L:
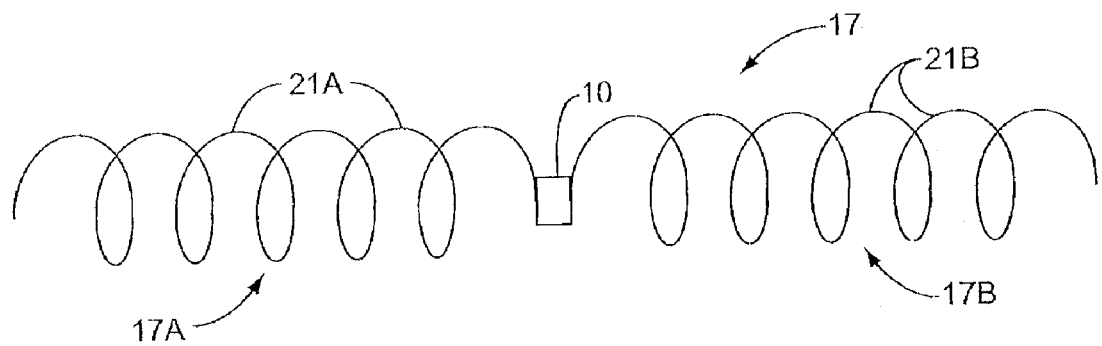
FIG. 2L is a schematic diagram of a dipole coil-shaped wave antenna coupled to a wireless communication device for wireless communications.

FIG. 2K illustrates an alternative embodiment of FIG. 2A, except that the wave antenna 17 comprises coil-shaped sections 211. The coil shape is a series of curves in the wave antenna 17 that form a commonly known coil shape. An example of a coil shape is a spring. The coil-shaped wave antenna 17 may be constructed so that no two different sections 21 of the antenna 17 touch each other to prevent shorting even in normal contraction situations. Or the coil-shaped wave antenna 17 may be designed so that different section 21 short together under normal conditions and/or contraction depending on the operating characteristics desired FIG. 2L illustrates an alternative embodiment of FIG. 2K, except that the wave antenna 17 is a dipole antenna. All other aspects for the elliptical curve-shaped wave antenna 17 embodiment discussed above and illustrated in FIG. 2I are equally applicable for this embodiment.

Figure 3A:
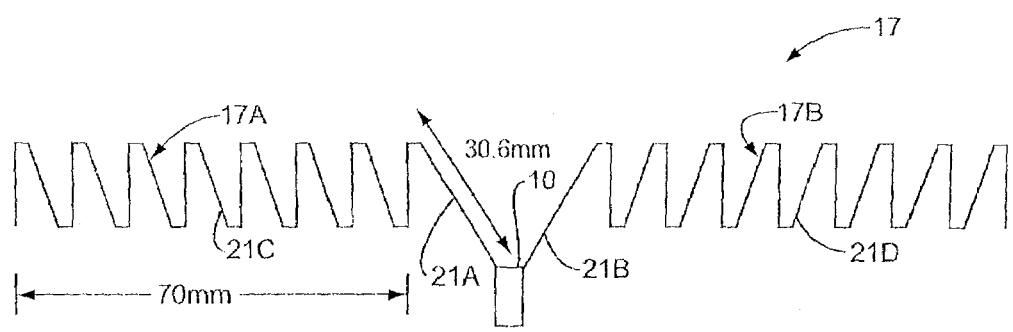
FIG. 3A is a schematic diagram of a dipole hexagonal-shaped wave antenna coupled to a wireless communication device wherein a first portion of the hexagonal-shaped wave antenna operates at a first frequency and a second portion of the hexagonal-shaped wave antenna coupled to the first portion operates at a second frequency.

FIG. 3A illustrates another embodiment of a hexagonal-shaped wave antenna 17 where the lengths of the individual sections 21 and the angle between the individual sections 21 are not the same. The hexagonal-shape of the wave antenna 17 is the same shape as illustrated and described in FIGS. 2A and 2B above.

Two conductors are coupled to the wireless communication device 10 to create a dipole hexagonal-shaped wave antenna 17. The first conductor is comprised out of two sections 21A, 21C, each having a different number of sections 21 and lengths. The two sections 21A, 21C are also symmetrically contained in the second conductor 21B, 21D. This causes the hexagonal-shaped wave antenna 17 to act as a dipole antenna that resonates and receives signals at two different operating frequencies so that the wireless communication device 10 is capable of communicating at two different frequencies.

The first symmetrical sections 21A, 21B are 30.6 millimeters or $\lambda/4$ in length and are coupled to the wireless communication device 10 so that the hexagonal-shaped wave antenna 17 is capable of receiving 2.45 GHz signals. The second symmetrical sections 21C, 21D are coupled to the first sections 21A, 21B, respectively, to form a second dipole antenna for receiving signals at a second frequency. In this embodiment, the second sections 21C, 21D are 70 millimeters in length and are coupled to the first sections 21A, 21B, respectively, to form lengths that are designed to receive 915 MHz signals. Also note that bends in the conductor in the hexagonal-shaped wave antenna 17 are not constant.

Figure 3B:
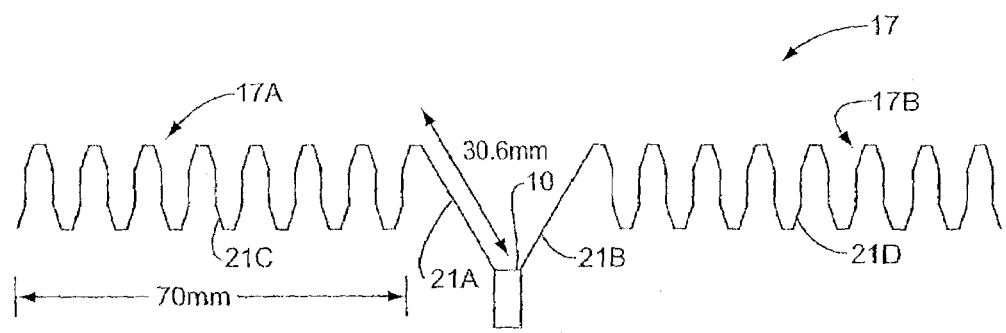
FIG. 3B is a schematic diagram of a dipole octagonal-shaped wave antenna coupled to a wireless communication device wherein a first portion of the octagonal-shaped wave antenna operates at a first frequency and a second portion of the octagaonal-shaped wave antenna coupled to the first portion operates at a second frequency.

FIG. 3B illustrates another embodiment similar to FIG. 3A, except that the wave antenna 17 is octagonal-shaped. The octagonal-shape of the wave antenna 17 is the same shape as illustrated and described in FIGS. 2C and 2D above. All other aspects for the hexagonal-shaped wave antenna 17 embodiment discussed above and illustrated in FIG. 3A are equally applicable for this embodiment.

Figure 3C:
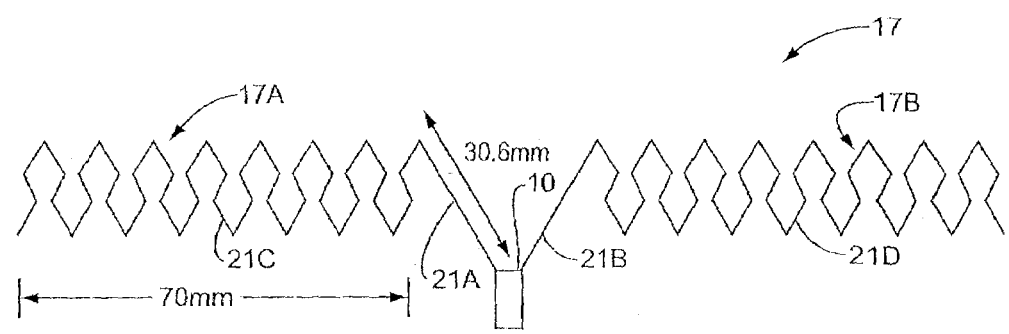
FIG. 3C is a schematic diagram of a dipole pentagonal-shaped wave antenna coupled to a wireless communication device wherein a first portion of the pentagonal shaped wave antenna operates at a first frequency and a second portion of the pentagonal-shaped wave antenna coupled to the first portion operates at a second frequency.

FIG. 3C illustrates another embodiment similar to FIG. 3A, except that the wave antenna 17 is pentagonal-shaped. The pentagonal-shape of the wave antenna 17 is the same shape as illustrated and described in FIGS. 2E and 2F above. All other aspects for the hexagonal-shaped wave antenna 17 embodiment discussed above and illustrated in FIG. 3A are equally applicable for this embodiment.

Figure 3D:
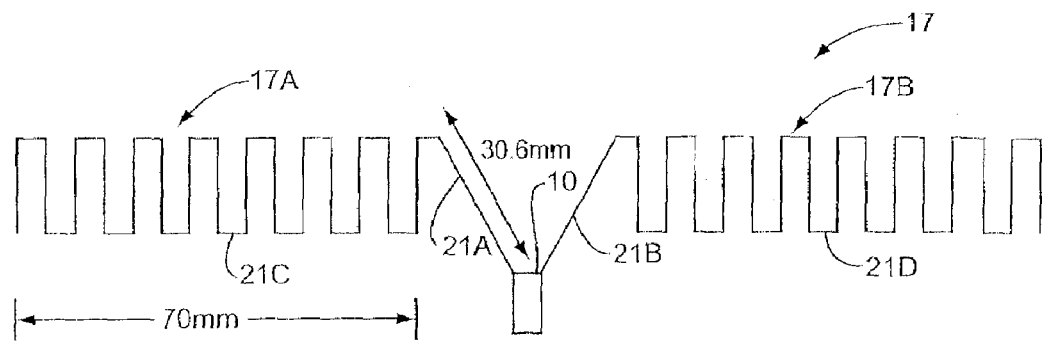
FIG. 3D is a schematic diagram of a dipole square-shaped wave antenna coupled to a wireless communication device wherein a first portion of the square-shaped wave antenna operates at a first frequency and a second portion of the square-shaped wave antenna coupled to the first portion operates at a second frequency.

FIG. 3D illustrates another embodiment similar to FIG. 3A, except that the wave antenna 17 is square-shaped, The square-shape of the wave antenna 17 is the same shape as illustrated and described in FIGS. 2G and 2H above. All other aspects for the hexagonal-shaped wave antenna 17 embodiment discussed above and illustrated in FIG. 3A are equally applicable for this embodiment.

Figure 3E:
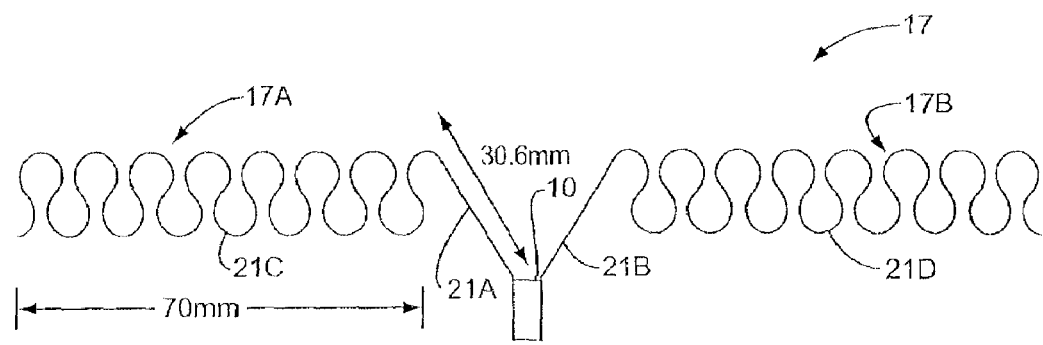
FIG. 3E is a schematic diagram of a dipole elliptical curve-shaped wave antenna coupled to a wireless communication device wherein a first portion of the elliptical curve-shaped wave antenna operates at a first frequency and a second portion of the elliptical curve-shaped wave antenna coupled to the first portion operates at a second frequency.

FIG. 3E illustrates another embodiment similar to FIG. 3A, except that the wave antenna 17 is elliptical curve-shaped. The elliptical curve-shape of the wave antenna 17 is the same shape as illustrated and described in FIGS. 2I and 2J above. All other aspects for the hexagonal-shaped wave antenna 17 embodiment discussed above and illustrated in FIG. 3A are equally applicable for this embodiment.

Figure 3F:
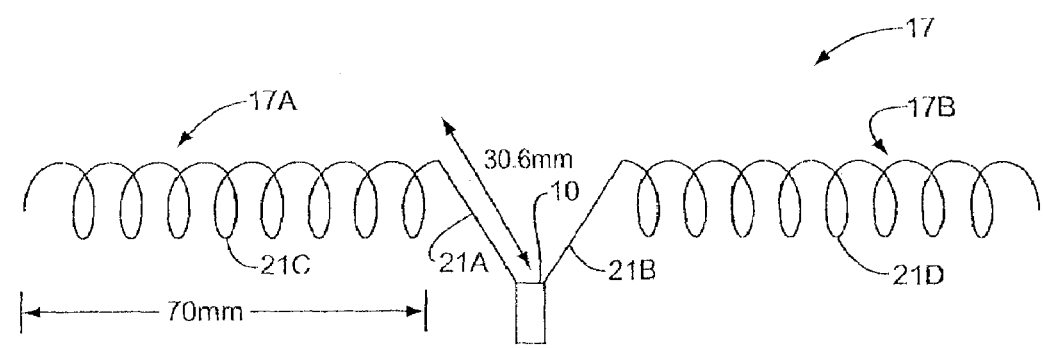
FIG. 3F is a schematic diagram of a dipole coil-shaped wave antenna coupled to a wireless communication device wherein a first portion of the coil-shaped wave antenna operates at a first frequency and a second portion of the coil-shaped wave antenna coupled to the first portion operates at a second frequency.

FIG. 3F illustrates another embodiment similar to FIG. 3A, except that the wave antenna 17 is coil-shaped. The coil-shape of the wave antenna 17 is the same shape as illustrated and described in FIGS. 2K and 2L above. All other aspects for the hexagonal-shaped wave antenna 17 embodiment discussed above and illustrated in FIG. 3A are equally applicable for this embodiment.

Figure 4A:
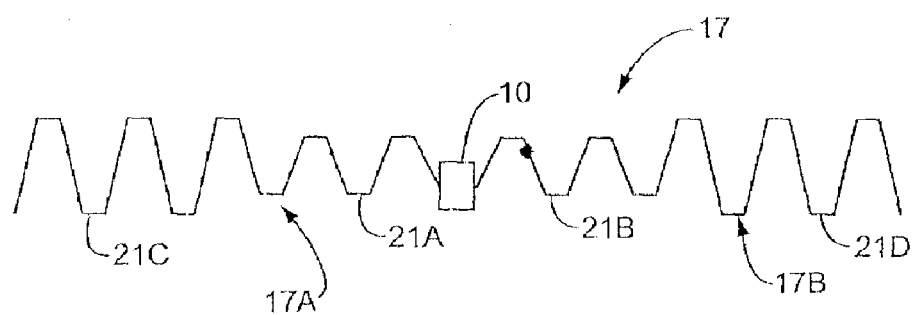
FIG. 4A is a schematic diagram of a dipole hexagonal-shaped wave antenna coupled to a wireless communication device for wireless communications wherein each hexagonal-shaped pole conductor comprises two sections each having different amplitudes.

FIG. 4A illustrates another embodiment of a hexagonal-shaped wave antenna 17 where the amplitudes of the individual sections 21 that form the hexagonal-shaped wave antenna 17 are not the same. The hexagonal-shape of the wave antenna 17 is the same shape as illustrated and described in FIGS. 2A and 2B above.

Two conductors are coupled to the wireless communication device 10 to create a dipole hexagonal-shaped wave antenna 17. The first conductor is comprised out of two sections 21A, 21C, each having a different number of sections 21 and different amplitudes. The two sections 21A, 21C are also symmetrically contained in the second conductor 21B, 21D. This causes the hexagonal-shaped wave antenna 17 to act as a dipole antenna that resonates and receives signals at two different operating frequencies so that the wireless communication device 10 is capable of communicating at two different frequencies.

Figure 4B:
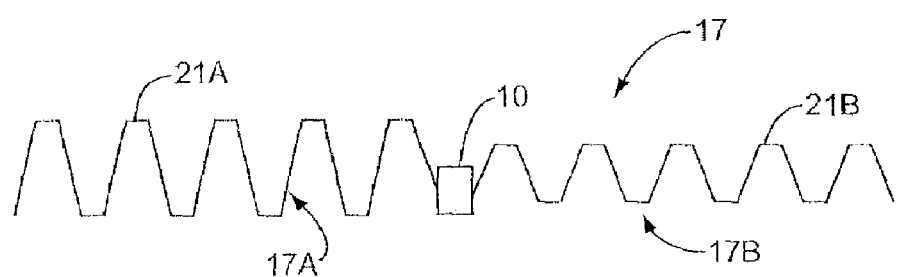
FIG. 4B is a schematic diagram of a dipole hexagonal-shaped wave antenna coupled to a wireless communication device for wireless communications wherein one hexagonal-shaped pole conductor has an amplitude larger than the other hexagonal-shaped pole conductor.

FIG. 4B illustrates another embodiment of an asymmetrical hexagonal-shaped wave antenna 17 where the amplitude of a first pole antenna 17A of the hexagonal-shaped wave antenna 17 has a different amplitude than the second pole antenna 17B of the hexagonal-shaped wave antenna 17. More information on asymmetrical pole antennas is disclosed on co-pending patent application Ser. No. 09/678,271, entitled "Wireless Communication Device and Method," assigned to the same assignee as the present invention, and incorporated herein by reference in its entirety.

Figure 4C:
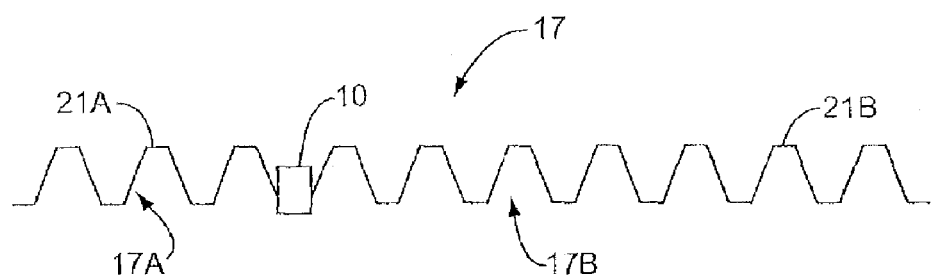
FIG. 4C is a schematic diagram of a dipole hexagonal-shaped wave antenna coupled to a wireless communication device for wireless communications wherein one hexagonal-shaped pole conductor is longer than the other hexagonal-shaped pole conductor.

FIG. 4C illustrates another embodiment of an asymmetrical hexagonal-shaped wave antenna 17 where the length of a first pole antenna 17A of the hexagonal-shaped wave antenna 17 is of a different length than the second pole antenna 17B of the hexagonal-shaped wave antenna 17.

Note that the embodiments of FIGS. 4A, 4B, and 4C may be combined to create an asymmetrical hexagonal-shaped dipole wave antenna 17 wherein the pole antennas 17A, 17B contain different lengths and different amplitudes, including different amplitudes within different sections 21, of a pole antenna 17A, 17B.

Figure 4D:
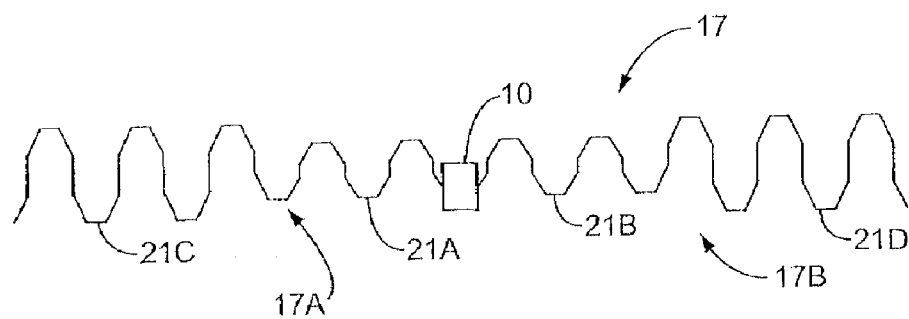
FIG. 4D is a schematic diagram of a dipole octagonal-shaped wave antenna coupled to a wireless communication device for wireless communications wherein each octagonal-shaped pole conductor comprises two sections each having different amplitudes.

FIG. 4D illustrates an alternative embodiment of FIG. 4A, except that the wave antenna 17 is comprised of sections 21 that are octagonal-shaped like the wave antenna 17 illustrated in FIGS. 2C and 2D and described above. All other aspects for the hexagonal-shaped wave antenna 17 embodiment discussed above and illustrated in FIG. 4A are equally applicable for this embodiment.

Figure 4E:
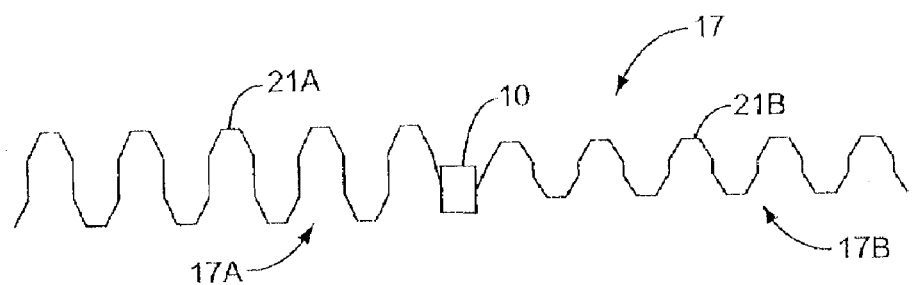
FIG. 4E is a schematic diagram of a dipole octagonal-shaped wave antenna coupled to a wireless communication device for wireless communications wherein one octagonal-shaped pole conductor has an amplitude larger than the other octagonal-shaped pole conductor.

FIG. 4E illustrates an alternative embodiment of FIG. 4B, except that the wave antenna 17 is comprised of sections 21 that are octogonal-shaped like the wave antenna 17 illustrated in FIGS. 2C and 2D and described above. All other aspects for the hexagonal-shaped wave antenna 17 embodiment discussed above and illustrated in FIG. 4B are equally applicable for this embodiment.

Figure 4F:
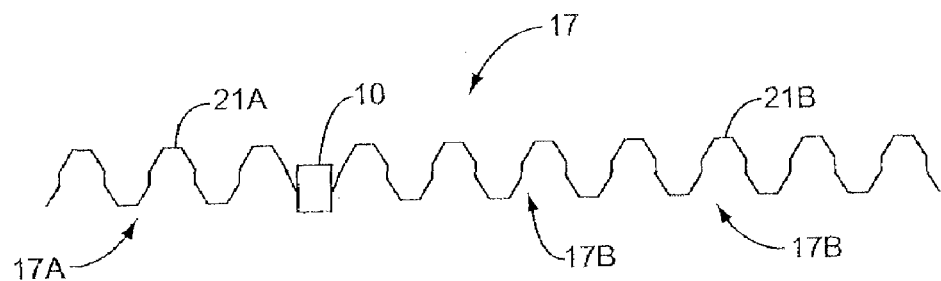
FIG. 4F is a schematic diagram of a dipole octagonal-shaped wave antenna coupled to a wireless communication device for wireless communications wherein one octagonal-shaped pole conductor is longer than the other octagonal-shaped pole conductor.

FIG. 4F illustrates an alternative embodiment of FIG. 4C, except that the wave antenna 17 is comprised of sections 21 that are octagonal-circle shaped like the wave antenna 17 illustrated in FIGS. 2C and 2D) and described above. All other aspects for the hexagonal-shaped wave antenna 17 embodiment discussed above and illustrated in FIG. 4C are equally applicable for this embodiment.

Note that the embodiments of FIGS. 4D, 4E, and 4F may be combined to create an asymmetrical octagonal-shaped dipole wave antenna 17 wherein the pole antennas 17A, 17B contain different lengths and different amplitudes, including different amplitudes within different sections 21, of a pole antenna 17A, 17B

Figure 4G:
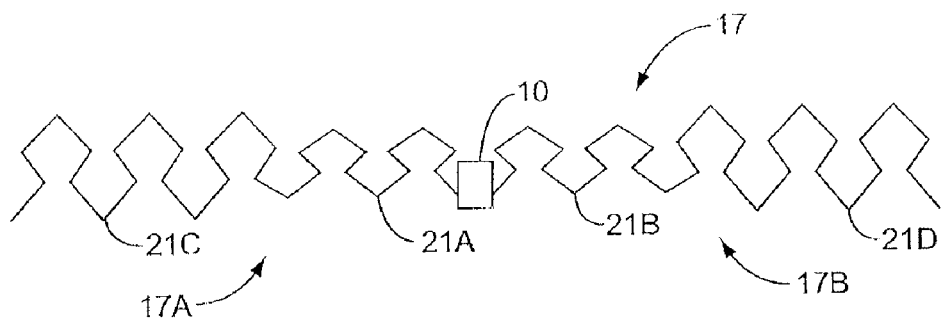
FIG. 4G is a schematic diagram of a dipole pentagonal-shaped wave antenna coupled to a wireless communication device for wireless communications wherein each pentagonal-shaped pole conductor comprises two sections each having different amplitudes.

FIG. 4G illustrates an alternative embodiment of FIG. 4A, except that the wave antenna 17 is comprised of sections 21 that are pentagonal-shaped like the wave antenna 17 illustrated in FIGS. 2E and 2F and described above. All other aspects for the hexagonal-shaped wave antenna 17 embodiment discussed above and illustrated in FIG. 4A are equally applicable for this embodiment.

Figure 4H:
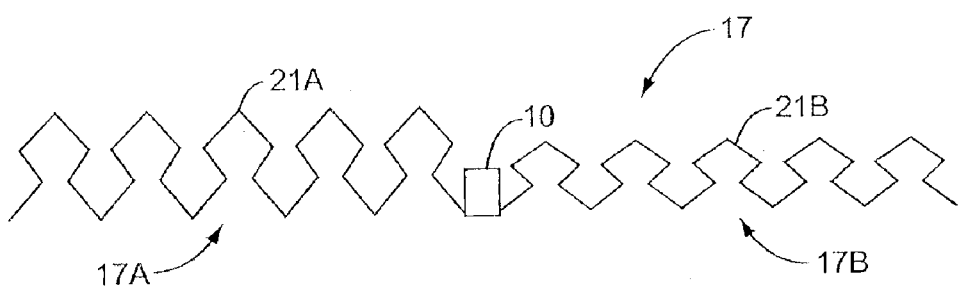
FIG. 4H is a schematic diagram of a dipole pentagonal-shaped wave antenna coupled to a wireless communication device for wireless communications wherein one pentagonal-shaped pole conductor has an amplitude larger than the other pentagonal-shaped pole conductor.

FIG. 4H illustrates an alternative embodiment of FIG. 4B, except that the wave antenna 17 is comprised of sections 21 that are pentagonal-shaped like the wave antenna 17 illustrated in FIGS. 2E and 2F and described above. All other aspects for the hexagonal-shaped wave antenna 17 embodiment discussed above and illustrated in FIG. 4B are equally applicable for this embodiment.

Figure 4I:
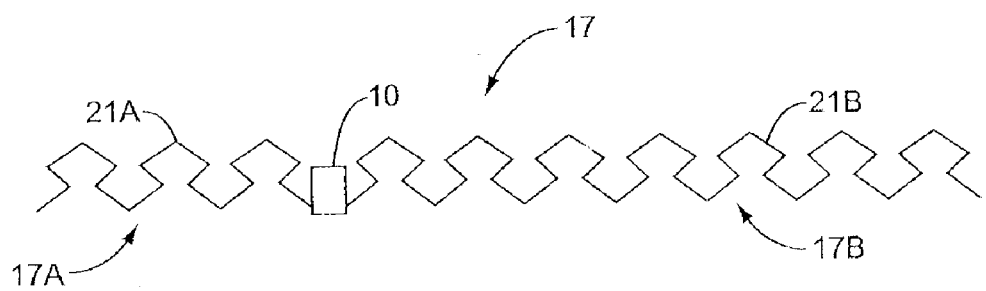
FIG. 4I is a schematic diagram of a dipole pentagonal-shaped wave antenna coupled to a wireless communication device for wireless communications wherein one pentagonal-shaped pole conductor is longer than the other pentagonal-shaped pole conductor.

FIG. 4I illustrates an alternative embodiment of FIG. 4C, except that the wave antenna 17 is comprised of sections 21 that are pentagonal-shaped like the wave antenna 17 illustrated in FIGS. 2E and 2F and described above All other aspects for the hexagonal-shaped wave antenna 17 embodiment discussed above and illustrated in FIG. 4C are equally applicable for this embodiment.

Note that the embodiments of FIGS. 4G, 4H, and 4I may be combined to create an asymmetrical pentagonal-shaped dipole wave antenna 17 wherein the pole antennas 17A, 17B contain different lengths and different amplitudes, including different amplitudes within different sections 21, of a pole antenna 17A, 17B.

Figure 4J:
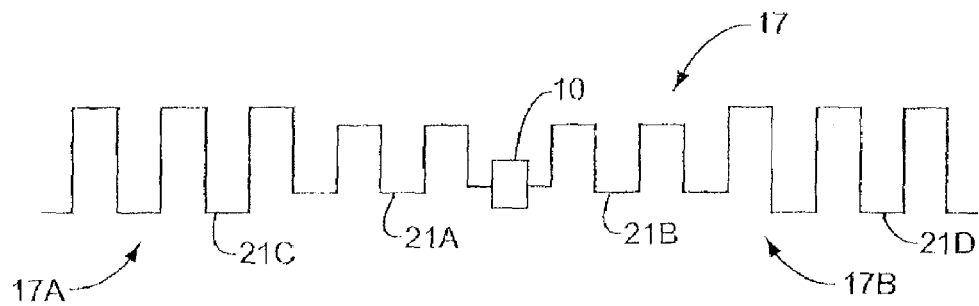
FIG. 4J is a schematic diagram of a dipole square-shaped wave antenna coupled to a wireless communication device for wireless communications wherein each square shaped pole conductor comprises two sections each having different amplitudes.

FIG. 4J illustrates an alternative embodiment of FIG. 4A, except that the wave antenna 17 is comprised of sections 21 that are square-shaped like the wave antenna 17 illustrated in FIGS. 2G and 2H and described above. All other aspects for the hexagonal-shaped wave antenna 17 embodiment discussed above and illustrated in FIG. 4A are equally applicable for this embodiment.

Figure 4K:
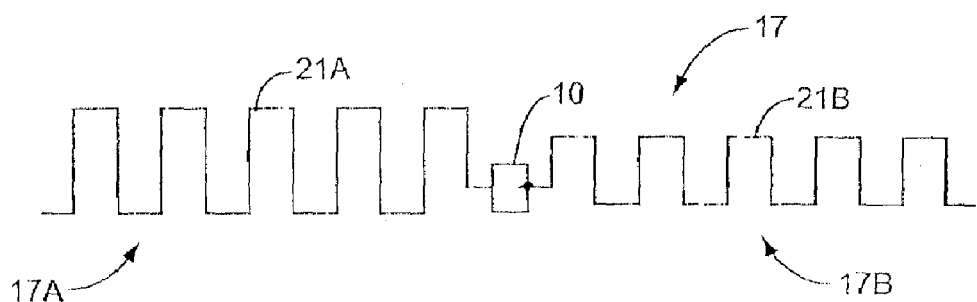
FIG. 4K is a schematic diagram of a dipole square-shaped wave antenna coupled to a wireless communication device for wireless communications wherein one square-shaped pole conductor has an amplitude larger than the other square-shaped pole conductor.

FIG. 4K illustrates an alternative embodiment of FIG. 4B, except that the wave antenna 17 is comprised of sections 21 that are square-shaped like the wave antenna 17 illustrated in FIGS. 2G and 2H and described above. All other aspects for the hexagonal-shaped wave antenna 17 embodiment discussed above and illustrated in FIG. 4B are equally applicable for this embodiment.

Figure 4L:
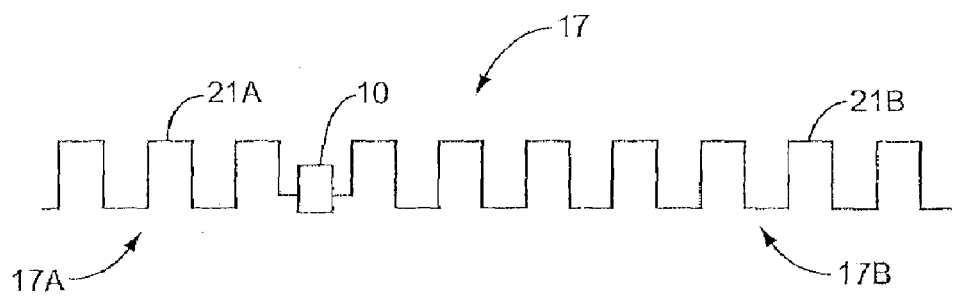
FIG. 4L is a schematic diagram of a dipole square-shaped wave antenna coupled to a wireless communication device for wireless communications wherein one square-shaped pole conductor is longer than the other square-shaped pole conductor.

FIG. 4L illustrates an alternative embodiment of FIG. 4C, except that the wave antenna 17 is comprised of sections 21 that are square-shaped like the wave antenna 17 illustrated in FIGS. 2G and 2H and described above. All other aspects for the hexagonal-shaped wave antenna 17 embodiment discussed above and illustrated in FIG. 4C are equally applicable for this embodiment Note that the embodiments of FIGS. 4J, 4K, and 4L may be combined to create an asymmetrical square-shaped dipole wave antenna 17 wherein the pole antennas 17A, 17B contain different lengths and different amplitudes, including different amplitudes within different sections 21, of a pole antenna 17A, 17B.

Figure 4M:
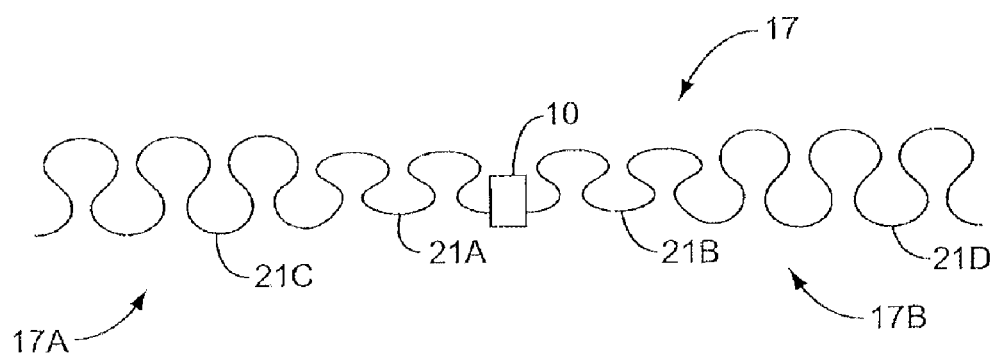
FIG. 4M is a schematic diagram of a dipole elliptical curve-shaped wave antenna coupled to a wireless communication device for wireless communications wherein each elliptical curve-shaped pole conductor comprises two sections each having different amplitudes.

FIG. 4M illustrates an alternative embodiment of FIG. 4A, except that the wave antenna 17 is comprised of sections 21 that are elliptical curve-shaped like the wave antenna 17 illustrated in FIGS. 2I and 2J and described above. All other aspects for the hexagonal-shaped wave antenna 17 embodiment discussed above and illustrated in FIG. 4A are equally applicable for this embodiment.

Figure 4N:
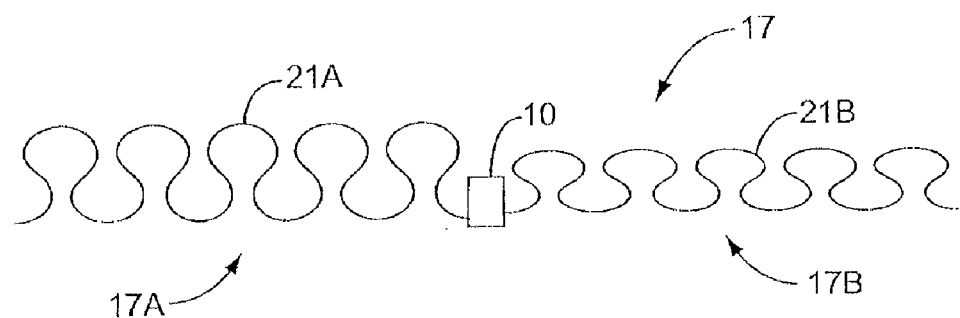
FIG. 4N is a schematic diagram of a dipole elliptical curve-shaped wave antenna coupled to a wireless communication device for wireless communications wherein one elliptical curve-shaped pole conductor has an amplitude larger than the other elliptical curve-shaped pole conductor.

FIG. 4N illustrates an alternative embodiment of FIG. 4B, except that the wave antenna 17 is comprised of sections 21 that are elliptical curve-shaped like the wave antenna 17 illustrated in FIGS. 2I and 2J and described above. All other aspects for the hexagonal-shaped wave antenna 17 embodiment discussed above and illustrated in FIG. 4B are equally applicable for this embodiment.

Figure 4O:
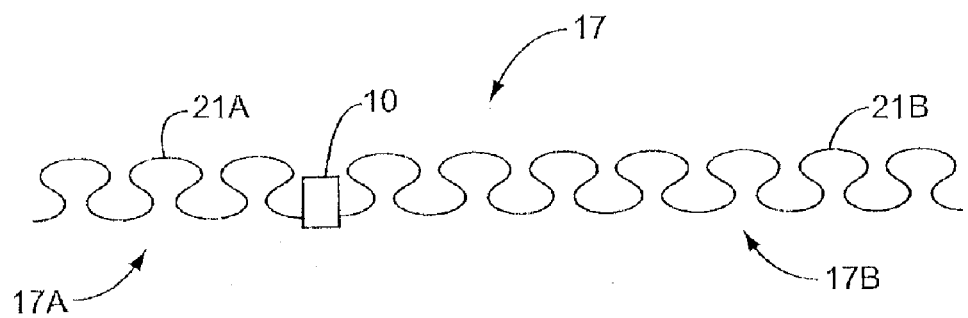
FIG. 4O is a schematic diagram of a dipole elliptical curve-shaped wave antenna coupled to a wireless communication device for wireless communications wherein one elliptical curve-shaped pole conductor is longer than the other elliptical curve-shaped pole conductor.

FIG. 4O illustrates an alternative embodiment of FIG. 4C except that the wave antenna 17 is comprised of sections 21 that are elliptical curve-shaped like the wave antenna 17 illustrated in FIGS. 2I and 2J and described above. All other aspects for the hexagonal-shaped wave antenna 17 embodiment discussed above and illustrated in FIG. 4C are equally applicable for this embodiment.

Figure 4P:
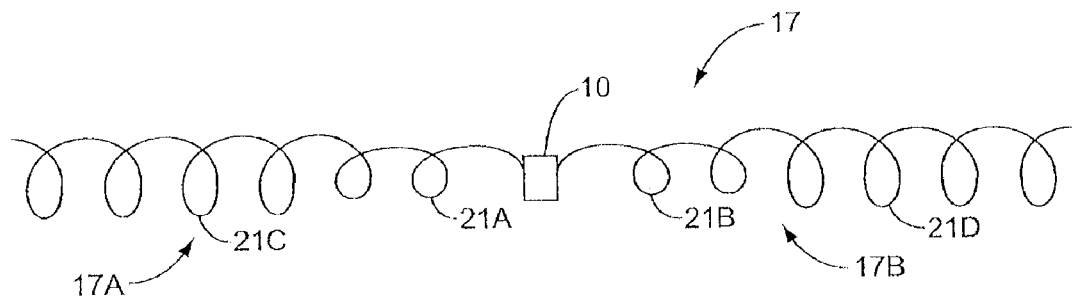
FIG. 4P is a schematic diagram of a dipole coil-shaped wave antenna coupled to a wireless communication device for wireless communications wherein each coil-shaped pole conductor comprises two sections each having different amplitudes.

Note that the embodiments of FIGS. 4M 4N, and 4O may be combined to create an asymmetrical elliptical curve-shaped dipole wave antenna 17 wherein the pole antennas 17A 17B contain different lengths and different amplitudes, including different amplitudes within different sections 21 of a pole antenna 17A, 17B FIG. 4P illustrates an alternative embodiment of FIG. 4A, except that the wave antenna 17 is comprised of sections 21 that are coil-shaped like the wave antenna 17 illustrated in FIGS. 2K and 2l and described above. All other aspects for the hexagonal-shaped wave antenna 17 embodiment discussed above and illustrated in FIG. 4A are equally applicable for this embodiment.

Figure 4Q:
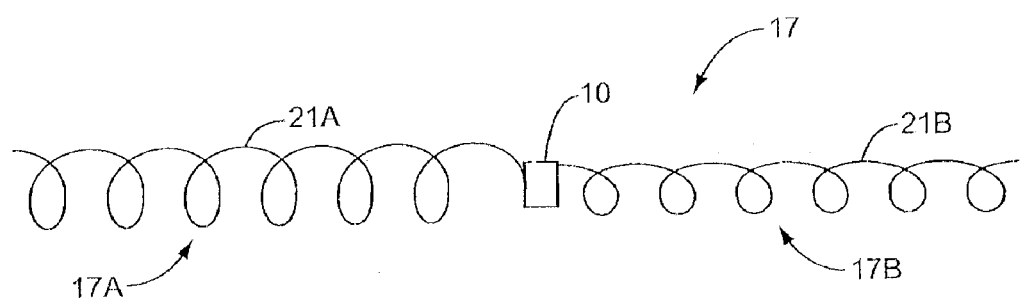
FIG. 4Q is a schematic diagram of a dipole coil-shaped wave antenna coupled to a wireless communication device for wireless communications wherein one coil-shaped pole conductor has an amplitude larger than the other coil-shaped pole conductor.
Figure 4R:
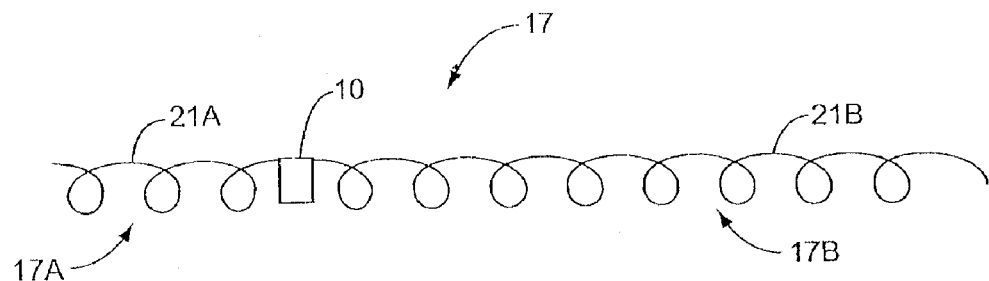
FIG. 4R is a schematic diagram of a dipole coil-shaped wave antenna coupled to a wireless communication device for wireless communications wherein one coil-shaped pole conductor is longer than the other coil-shaped pole conductor.

FIG. 4Q illustrates an alternative embodiment of FIG. 4B, except that the wave antenna 17 is comprised of sections 21 that are coil-shaped like the wave antenna 17 illustrated in FIGS. 2K and 2L and described above. All other aspects for the hexagonal-shaped wave antenna 17 embodiment discussed above and illustrated in FIG. 4B are equally applicable for this embodiment FIG. 4R illustrates an alternative embodiment of FIG. 4C, except that the wave antenna 17 is comprised of sections 21 that are coil-shaped like the wave antenna 17 illustrated in FIGS. 2K and 2L and described above All other aspects for the hexagonal-shaped wave antenna 17 embodiment discussed above and illustrated in FIG. 4C are equally applicable for this embodiment Note that the embodiments of FIGS. 4P, 4O, and 4R may be combined to create an asymmetrical coil-shaped dipole wave antenna 17 wherein the pole antennas 17A, 17B contain different lengths and different amplitudes, including different amplitudes within different sections 21, of a pole antenna 17A, 17B.

Figure 5A:
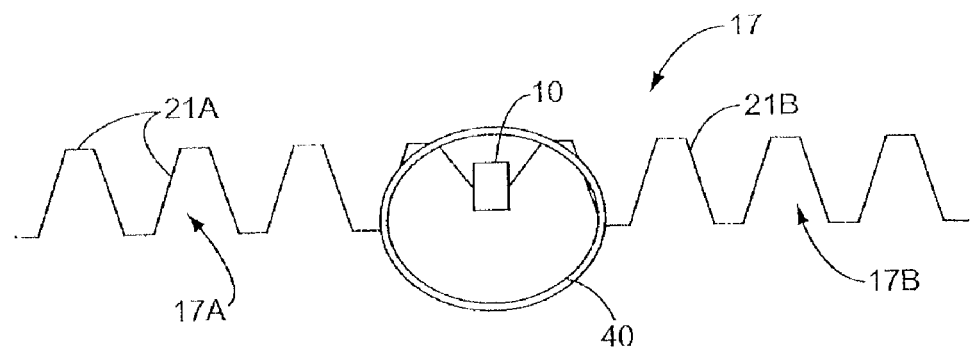
FIG. 5A is a schematic diagram of a hexagonal-shaped wave antenna and a ring resonator both coupled to a wireless communication device wherein the hexagonal-shaped wave antenna operates at a first frequency and the ring resonator operates at a second frequency.

FIG. 5A illustrates another embodiment of the hexagonal-shaped wave antenna 17 coupled to the wireless communication device 10 wherein the wireless communication device 10 is configured to receive signals at two different frequencies. A hexagonal-shaped wave antenna 17 similar the hexagonal-shaped wave antenna 17 illustrated in FIGS. 2A and 2B is coupled to the wireless communication device 10 to form a dipole hexagonal-shaped wave antenna 17. A resonating ring 40 is also capacitively coupled to the wireless communication device 10 to provide a second antenna 17 that operates at a second and different frequency from the operating frequency of the dipole hexagonal-shaped wave antenna 17. The resonating ring 40 may be constructed out of any type of material so long as the material is conductive.

This embodiment may be particularly advantageous if it is necessary for the wireless communication device 10 to be capable of wirelessly communicating regardless of the force, such as stretching or compression, exerted on the hexagonal-shaped wave antenna 17. The resonating ring 40 is designed to remain in its original shape regardless of the application of any force that may be placed on the wireless communication device 10 or a good, object, or article of manufacture that contains the wireless communication device 10. Depending on the force exerted on the hexagonal-shaped wave antenna 17 or a good, object or article of manufacture that contains the hexagonal-shaped wave antenna 17 and wireless communication device 10, the length of the hexagonal shaped wave antenna 17 may change, thereby changing the operating frequency of the hexagonal-shaped wave antenna 17. The new operating frequency of the hexagonal-shaped wave antenna 17 may be sufficiently different from the normal operating frequency such that hexagonal-shaped wave antenna 17 and the wireless communication device 10 could not receive and/or demodulate signals sent by the interrogation reader 20. The resonating ring 40 is capable of receiving signals 32 regardless of the state of the hexagonal-shaped wave antenna 17

Figure 5B:
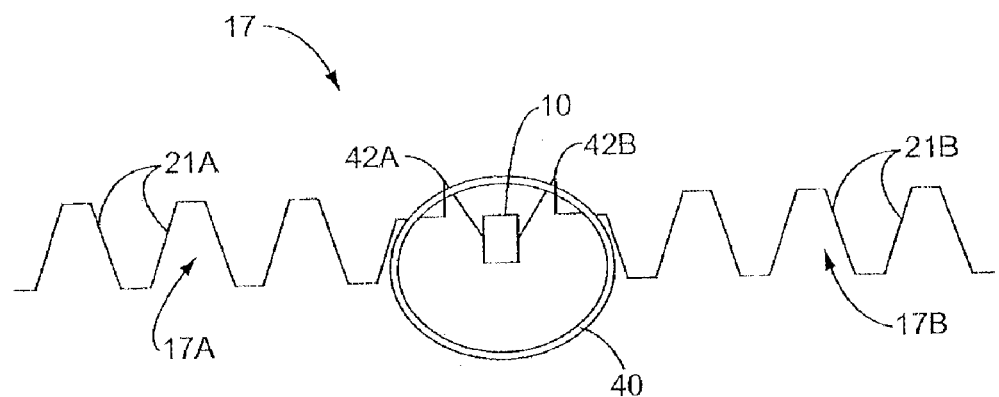
FIG. 5B is a schematic diagram of the hexagonal-shaped wave antenna and a ring resonator as illustrated in FIG. 5A, except that the ring resonator is additionally mechanically coupled to the hexagonal-shaped wave antenna as a mechanical stress relief.

FIG. 5B also illustrates an embodiment of the present invention employing a dipole hexagonal-shaped wave antenna 17 that operates at 915 MHz and a resonating ring 40 that operates at 2.45 GHz. The dipole hexagonal-shaped wave antenna 17 and the resonating ring 40 are both coupled to the wireless communication device 10 to allow the wireless communication device 10 to operate at two different frequencies. However, in this embodiment, the conductors of the dipole hexagonal-shaped wave antenna 17 are looped around the resonating ring 40 at a first inductive turn 42A and a second inductive turn 42B. In this manner, any force placed on the dipole hexagonal-shaped wave antenna 17 will place such force on the resonating ring 40 instead of the wireless communication device 10.

This embodiment may be advantageous in cases where a force placed on the dipole hexagonal-shaped wave antenna 17 without providing a relief mechanism other than the wireless communication device 10 itself would possibly cause the dipole hexagonal-shaped wave antenna 17 to disconnect from the wireless communication device 10, thus causing the wireless communication device 10 to be unable to wirelessly communicate. The resonating ring 40 may be constructed out of a stronger material than the connecting point between the dipole hexagonal-shaped wave antenna 17 and the wireless communication device 10, thereby providing the ability to absorb any force placed on the dipole hexagonal-shaped wave antenna 17 without damaging the resonating ring 40. This embodiment may also be particularly advantageous if the wireless communication device 10 is placed on a good, object or article of manufacture that undergoes force during its manufacture or use, such as a rubber tire, for example.

Figure 5C:
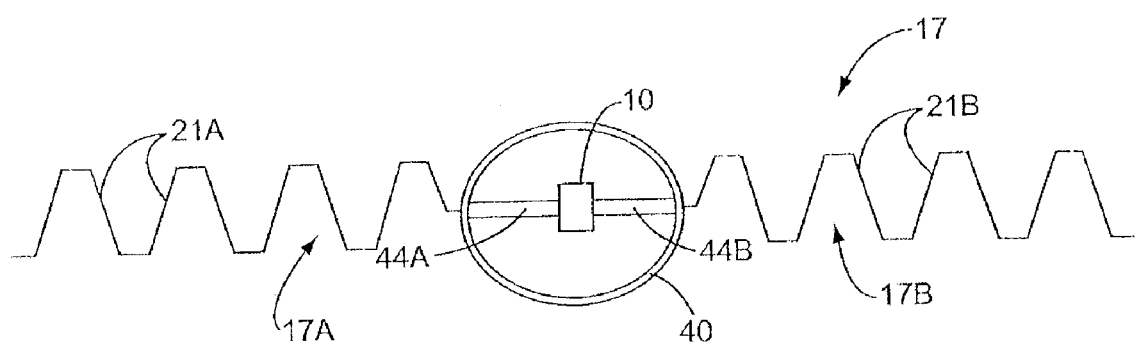
FIG. 5C is a schematic diagram of an alternative embodiment to FIG. 5B.

FIG. 5C illustrates another embodiment similar to those illustrated in FIGS. 5A and 5B. However, the resonating ring 40 is directly coupled to the wireless communication device 10, and the dipole hexagonal-shaped wave antenna 17 is directly coupled to the resonating ring 10. A first and second conducting attachments 44A, 44B are used to couple the resonating ring 40 to the wireless communication device 10. A force exerted on the dipole hexagonal-shaped wave antenna 17 is exerted on and absorbed by the resonating ring 40 rather than wireless communication device 10 so that the wireless communication device 10 is not damaged.

Figure 5D:
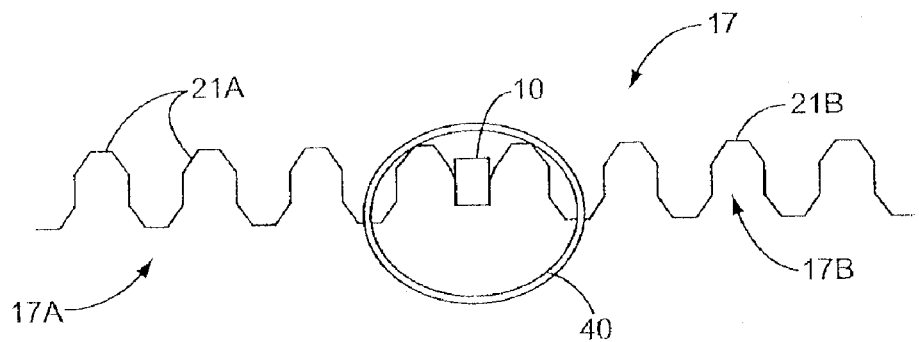
FIG. 5D is a schematic diagram of a octagonal-shaped wave antenna and a ring resonator both coupled to a wireless communication device wherein the octagonal-shaped wave antenna operates at a first frequency and the ring resonator operates at a second frequency.

FIG. 5D illustrates an alternative embodiment of FIG. 5A, except that the wave antenna 17 is comprised of sections 21 that are octagonal-shaped like that illustrated in FIGS. 2C and 2D and described above. All other aspects for the hexagonal-shaped wave antenna 17 embodiment discussed above and illustrated in FIG. 5A are equally applicable for this embodiment.

Figure 5E:
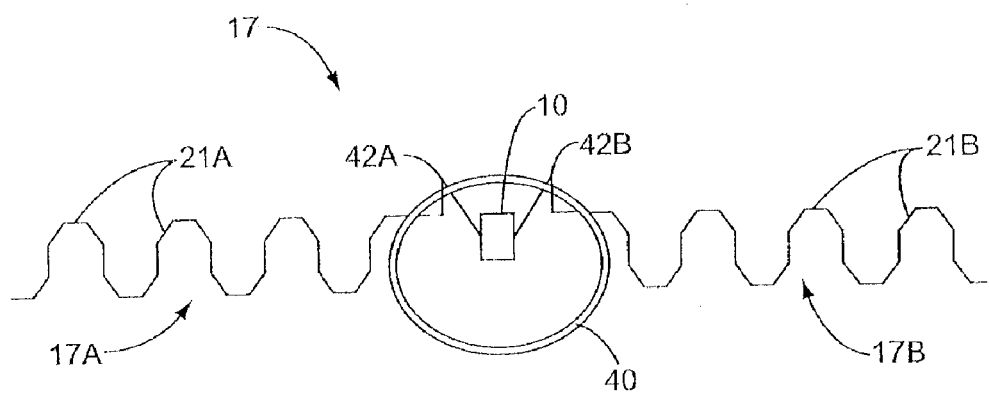
FIG. 5E is a schematic diagram of the octagonal-shaped wave antenna and a ring resonator as illustrated in FIG. 5D, except that the ring resonator is additionally mechanically coupled to the octagonal-shaped wave antenna as a mechanical stress relief.

FIG. 5E illustrates an alternative embodiment of FIG. 5B, except that the wave antenna 17 is comprised of sections 21 that are octogonal-shaped like that illustrated in FIGS. 2C and 2D and described above. All other aspects for the hexagonal-shaped wave antenna 17 embodiment discussed above and illustrated in FIG. 5B are equally applicable for this embodiment.

Figure 5F:
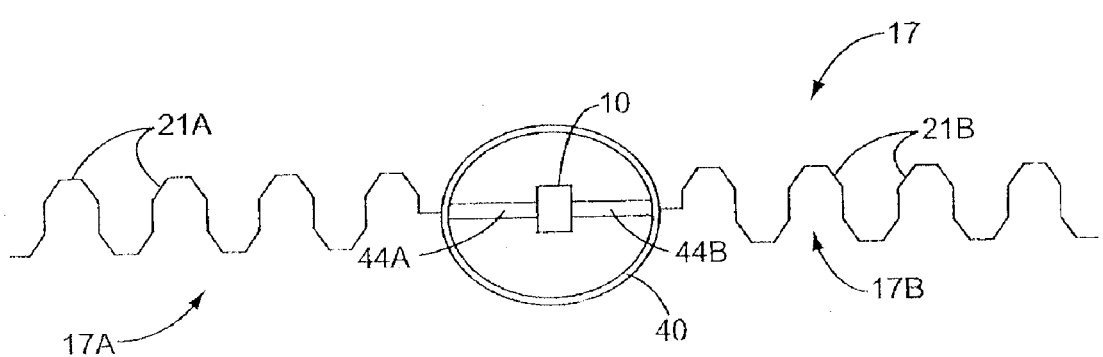
FIG. 5F is a schematic diagram of an alternative embodiment to FIG. 5E.

FIG. 5F illustrates an alternative embodiment of FIG. 5C, except that the wave antenna 17 is comprised of sections 21 that are octagonal-shaped liked that illustrated in FIGS. 2C and 2D and described above. All other aspects for the hexagonal-shaped wave antenna 17 embodiment discussed above and illustrated in FIG. 5C are equally applicable for this embodiment.

Figure 5G:
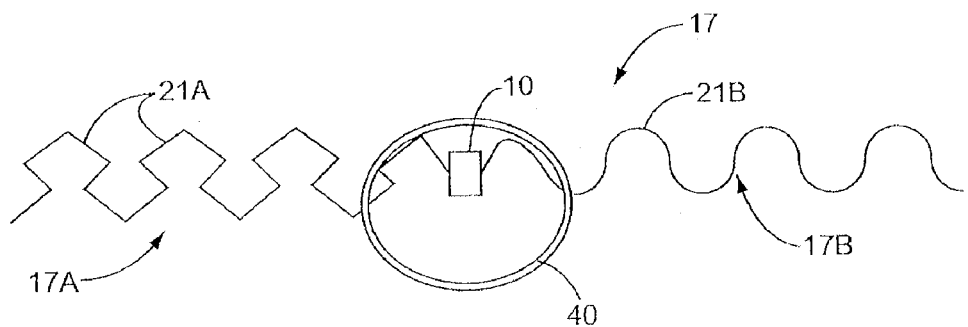
FIG. 5G is a schematic diagram of a pentagonal-shaped wave antenna and a ring resonator both coupled to a wireless communication device wherein the pentagonal-shaped wave antenna operates at a first frequency and the ring resonator operates at a second frequency.
Figure 5H:
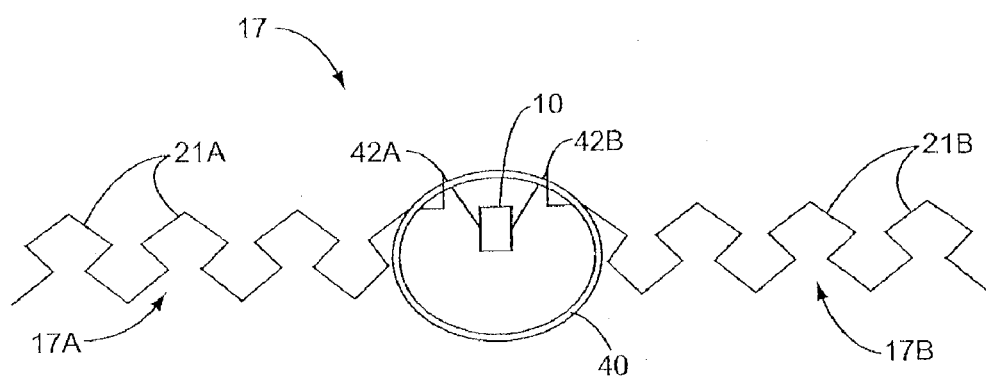
FIG. 5H is a schematic diagram of the pentagonal-shaped wave antenna and a ring resonator as illustrated in FIG. 5G, except that the ring resonator is additionally mechanically coupled to the pentagonal-shaped wave antenna as a mechanical stress relief.
Figure 5I:
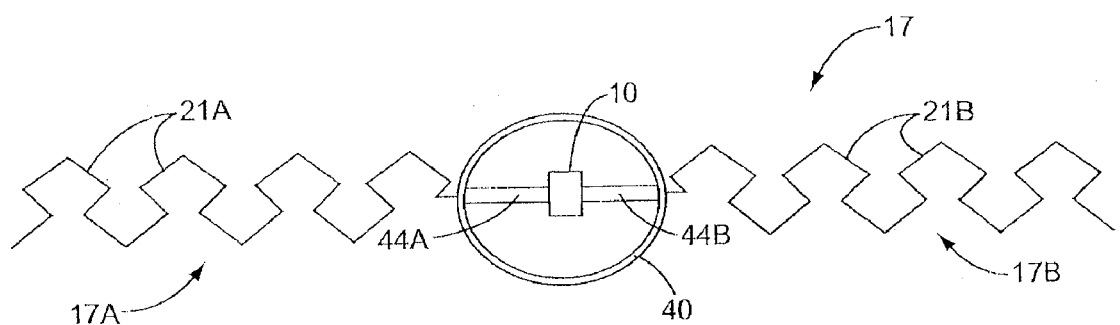
FIG. 5I is a schematic diagram of an alternative embodiment to FIG. 5H.

FIG. 5G illustrates an alternative embodiment of FIG. 5A, except that the wave antenna 17 is comprised of sections 21 that are pentagonal-shaped like that illustrated in FIGS. 2E and 2F and described above. All other aspects for the hexagonal-shaped wave antenna 17 embodiment discussed above and illustrated in FIG. 5A are equally applicable for this embodiment FIG. 5H illustrates an alternative embodiment of FIG. 5B, except that the wave antenna 17 is comprised of sections 21 that are pentagonal-shaped that illustrated in FIGS. 2E and 2F and described above. All other aspects for the hexagonal-shaped wave antenna 17 embodiment discussed above and illustrated in FIG. 5B are equally applicable for this embodiment FIG. 5I illustrates an alternative embodiment of FIG. 5C, except that the wave antenna 17 is comprised of sections 21 that are pentagonal-shaped liked that illustrated in FIGS. 2E and 2F and described above. All other aspects for the hexagonal-shaped wave antenna 17 embodiment discussed above and illustrated in FIG. 5C are equally applicable for this embodiment.

Figure 5J:
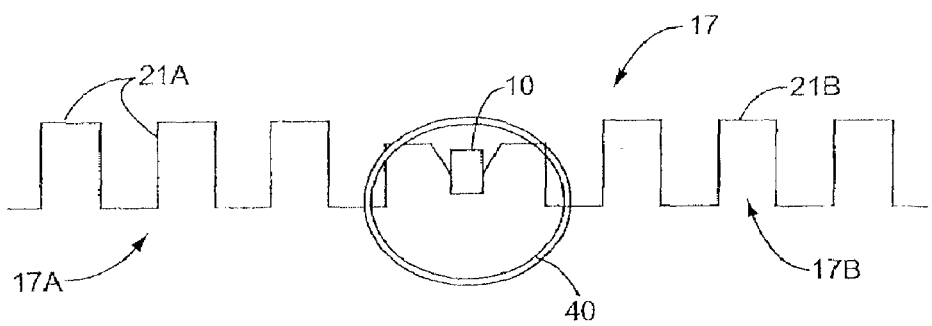
FIG. 5J is a schematic diagram of a square-shaped wave antenna and a ring resonator both coupled to a wireless communication device wherein the square-shaped wave antenna operates at a first frequency and the ring resonator operates at a second frequency.
Figure 5K:
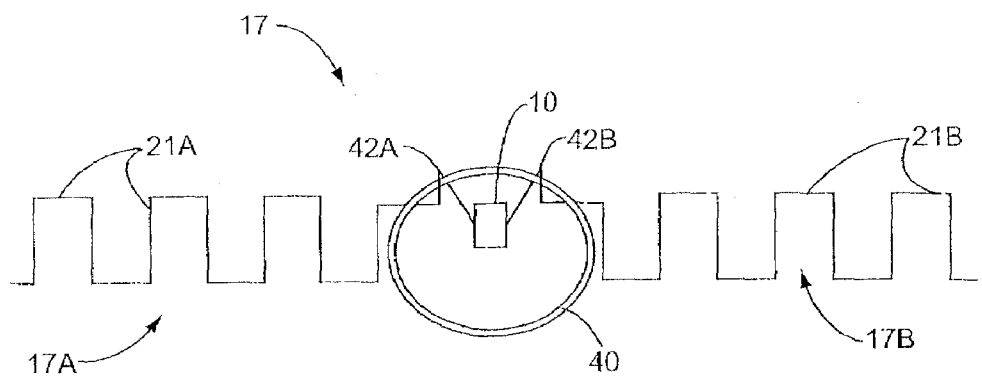
FIG. 5K is a schematic diagram of the square-shaped wave antenna and a ring resonator as illustrated in FIG. 5J, except that the ring resonator is additionally mechanically coupled to the square-shaped wave antenna as a mechanical stress relief.

FIG. 5J illustrates an alternative embodiment of FIG. 5A, except that the wave antenna 17 is comprised of sections 21 that are square-shaped like that illustrated in FIGS. 2G and 2H and described above. All other aspects for the hexagonal-shaped wave antenna 17 embodiment discussed above and illustrated in FIG. 5A are equally applicable for this embodiment FIG. 5K illustrates an alternative embodiment of FIG. 5B, except that the wave antenna 17 is comprised of sections 21 that are square-shaped that illustrated in FIGS. 2G and 2H and described above. All other aspects for the hexagonal-shaped wave antenna 17 embodiment discussed above and illustrated in FIG. 5B are equally applicable for this embodiment.

Figure 5L:
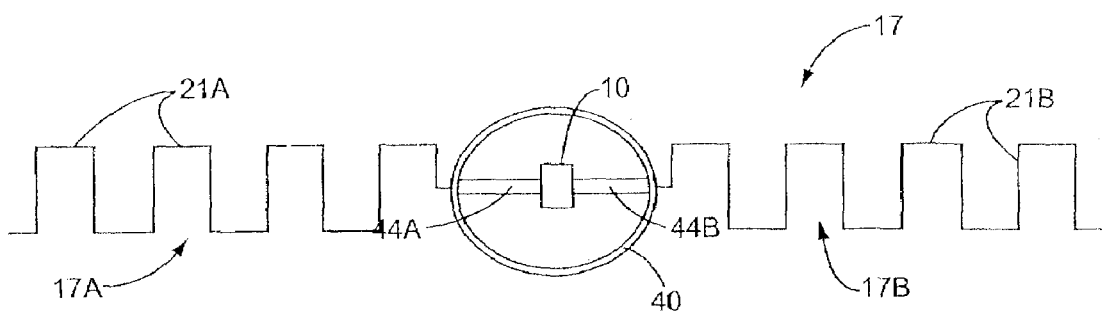
FIG. 5L is a schematic diagram of an alternative embodiment to FIG. 5K.

FIG. 5L illustrates an alternative embodiment of FIG. 5C, except that the wave antenna 17 is comprised of sections 21 that are square-shaped liked that illustrated in FIGS. 2G and 2H and described above. All other aspects for the hexagonal-shaped wave antenna 17 embodiment discussed above and illustrated in FIG. 5C are equally applicable for this embodiment.

Figure 5M:
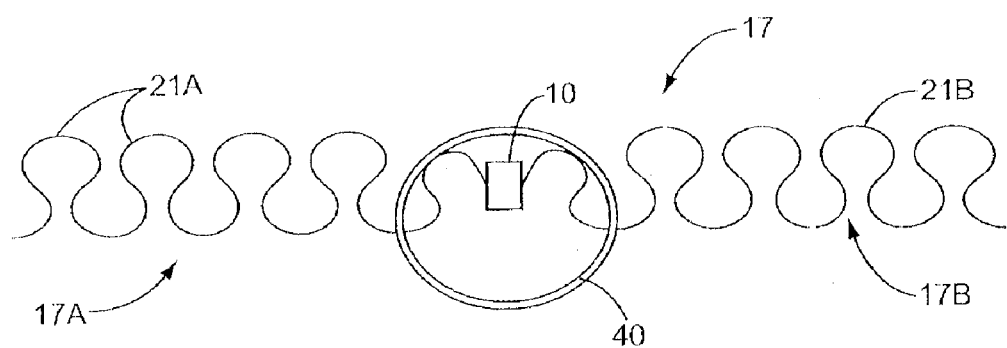
FIG. 5M is a schematic diagram of an elliptical curve-shaped wave antenna and a ring resonator both coupled to a wireless communication device wherein the elliptical curve-shaped wave antenna operates at a first frequency and the ring resonator operates at a second frequency.

FIG. 5M illustrates an alternative embodiment of FIG. 5A, except that the wave antenna 17 is comprised of sections 21 that are elliptical curve-shaped like that illustrated in FIGS. 2I and 2J and described above. All other aspects for the hexagonal-shaped wave antenna 17 embodiment discussed above and illustrated in FIG. 5A are equally applicable for this embodiment.

Figure 5N:
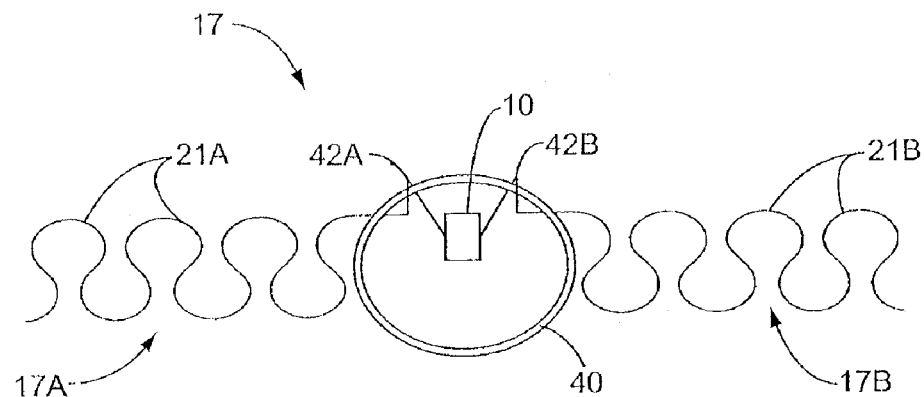
FIG. 5N is a schematic diagram of the elliptical curve-shaped wave antenna and a ring resonator as illustrated in FIG. 5M, except that the ring resonator is additionally mechanically coupled to the elliptical curve-shaped wave antenna as a mechanical stress relief.

FIG. 5N illustrates an alternative embodiment of FIG. 5B, except that the wave antenna 17 is comprised of sections 21 that are elliptical curve-shaped that illustrated in FIGS. 2I and 2J and described above. All other aspects for the hexagonal-shaped wave antenna 17 embodiment discussed above and illustrated in FIG. 5B are equally applicable for this embodiment.

Figure 5O:
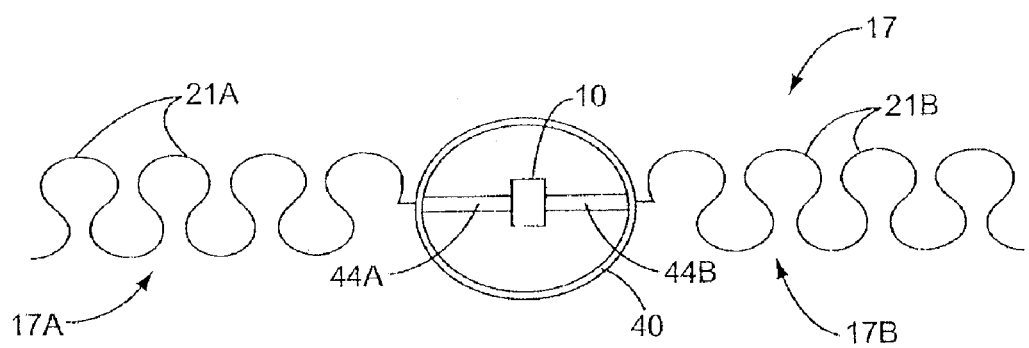
FIG. 5O is a schematic diagram of an alternative embodiment to FIG. 5N.

FIG. 5O illustrates an alternative embodiment of FIG. 5C, except that the wave antenna 17 is comprised of sections 21 that are elliptical curve shaped liked that illustrated in FIGS. 2I and 2J and described above. All other aspects for the hexagonal-shaped wave antenna 17 embodiment discussed above and illustrated in FIG. 5C are equally applicable for this embodiment.

Figure 5P:
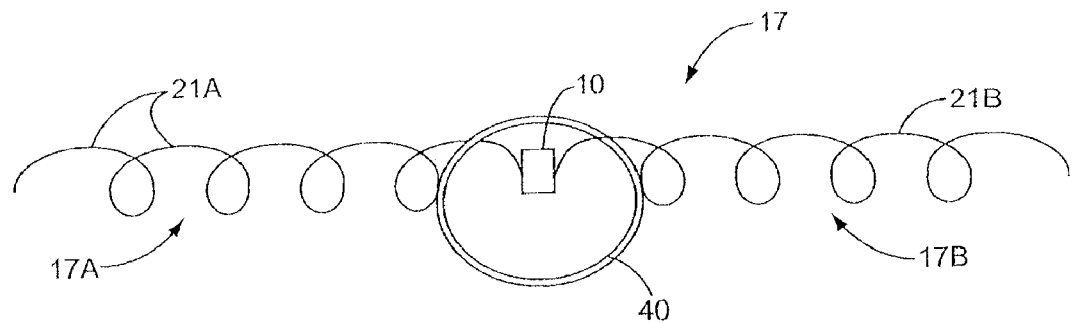
FIG. 5P is a schematic diagram of a coil-shaped wave antenna and a ring resonator both coupled to a wireless communication device wherein the coil-shaped wave antenna operates at a first frequency and the ring resonator operates at a second frequency.

FIG. 5P illustrates an alternative embodiment of FIG. 5A, except that the wave antenna 17 is comprised of sections 21 that are coil-shaped like that illustrated in FIGS. 2K and 2L and described above. All other aspects for the hexagonal-shaped wave antenna 17 embodiment discussed above and illustrated in FIG. 5A are equally applicable for this embodiment.

Figure 5Q:
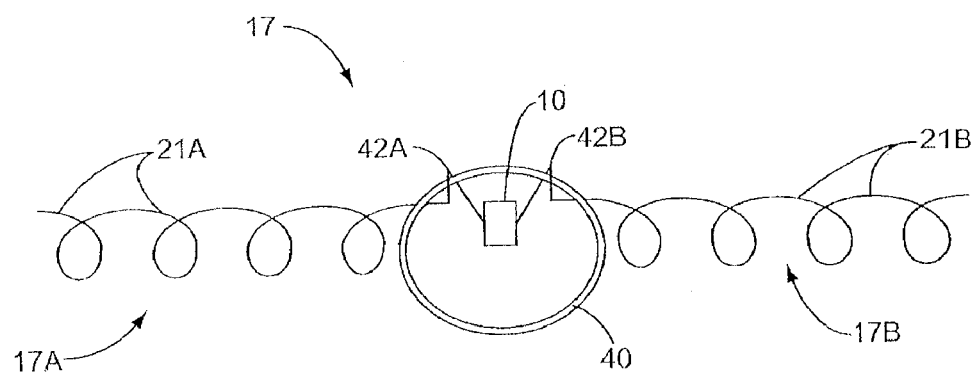
FIG. 5Q is a schematic diagram of the coil-shaped wave antenna and a ring resonator as illustrated in FIG. 5P, except that the ring resonator is additionally mechanically coupled to the coil-shaped wave antenna as a mechanical stress relief.

FIG. 5Q illustrates an alternative embodiment of FIG. 5B, except that the wave antenna 17 is comprised of sections 21 that are coil-shaped that illustrated in FIGS. 2K and 2L and described above. All other aspects for the hexagonal-shaped wave antenna 17 embodiment discussed above and illustrated in FIG. 5B are equally applicable for this embodiment.

Figure 5R:
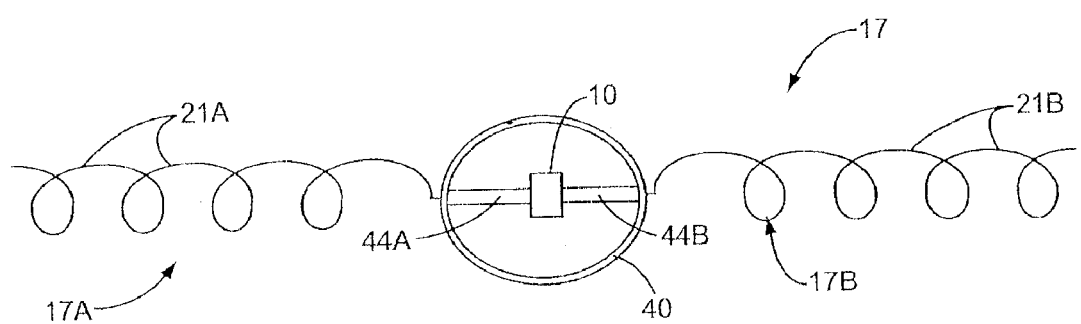
FIG. 5R is a schematic diagram of an alternative embodiment to FIG. 5Q.

FIG. 5R illustrates an alternative embodiment of FIG. 5C, except that the wave antenna 17 is comprised of sections 21 that are coil-shaped liked that illustrated in FIGS. 2K and 2L and described above. All other aspects for the hexagonal-shaped wave antenna 17 embodiment discussed above and illustrated in FIG. 5C are equally applicable for this embodiment.

Figure 6A:
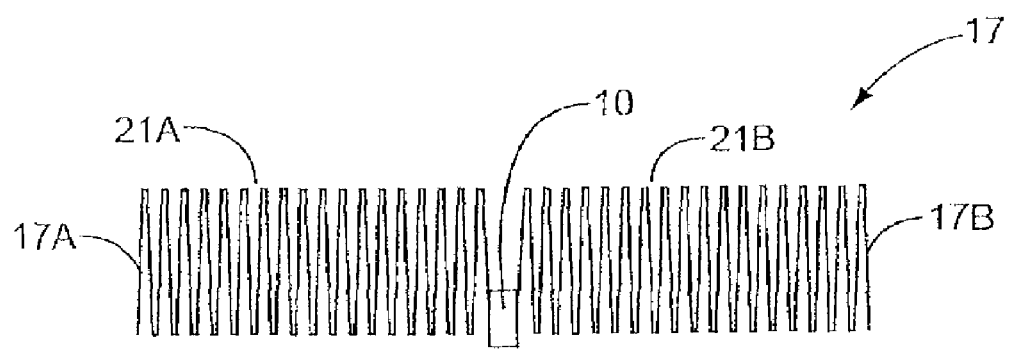
FIG. 6A is a schematic diagram of another embodiment of a hexagonal-shaped wave antenna and wireless communication device.

FIG. 6A illustrates another embodiment of the hexagonal-shaped wave antenna 17 like that illustrated in FIGS. 2A and 2B that illustrates sections 21 close to each other. The coupling between the individual elements in the hexagonal-shaped wave antenna 17 will be strong due to the proximity. Therefore, a small change in stretching of the hexagonal-shaped wave antenna 17 will have a large effect on the operating frequency of the hexagonal-shaped wave antenna 17. Since the change in the operating frequency will be great, it will be easier for a small stretching of the hexagonal-shaped wave antenna 17 to change the operating frequency of the hexagonal-shaped wave antenna 17.

Figure 6B:
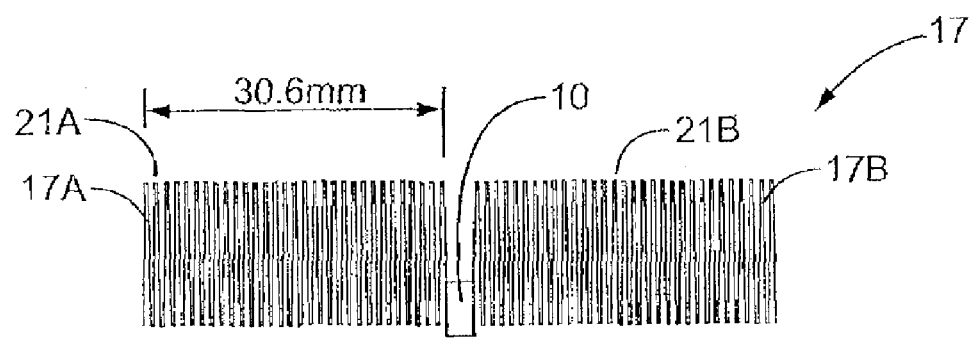
FIG. 6B is a schematic diagram of a compressed version of the hexagonal-shaped wave antenna illustrated in FIG. 6A.

FIG. 6B illustrates the same hexagonal-shaped wave antenna 17 and wireless communication device 10 illustrated in FIG. 6A, however, the hexagonal-shaped wave antenna 17 is not being stretched. When this hexagonal-shaped wave antenna 17 is not being stretched, the sections 21 in the hexagonal-shaped wave antenna 17 touch each other to effectively act as a regular dipole antenna without angled sections 21. In this embodiment, each pole 17A, 17B of the hexagonal-shaped wave antenna 17 in its normal form is 30.6 millimeters long and has an operating frequency of 2.45 GHz such that the wireless communication device 10 is capable of responding to a frequency of 2.45 GHz.

Figure 6C:
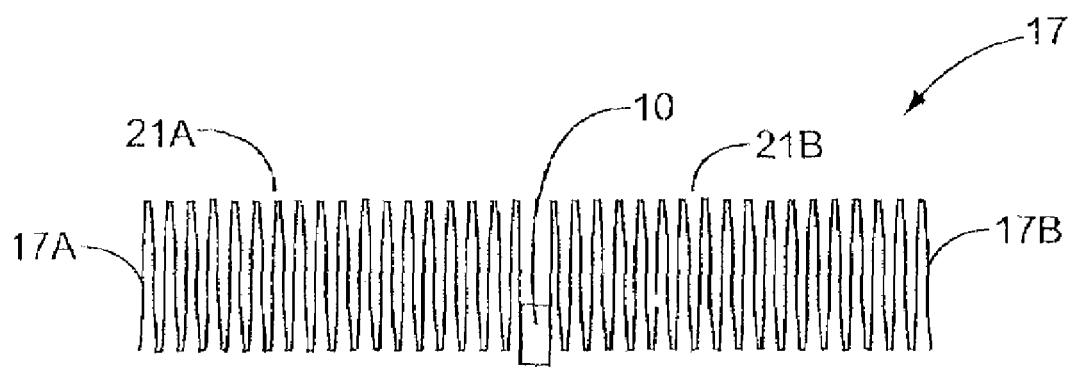
FIG. 6C is a schematic diagram of another embodiment of an octagonal-shaped wave antenna and wireless communication device.

FIG. 6C illustrates an alternative embodiment of FIG. 6A, except that the wave antenna 17 is comprised of sections 21 that are octagonal-shaped like that illustrated in FIGS. 2C and 2D. All other aspects for the hexagonal-shaped wave antenna 17 embodiment discussed above and illustrated in FIG. 6A are equally applicable for this embodiment.

Figure 6D:
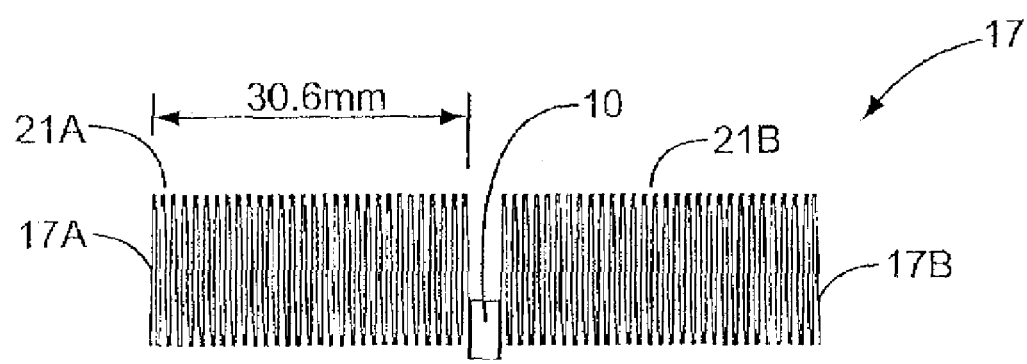
FIG. 6D is a schematic diagram of a compressed version of the octagonal-shaped wave antenna illustrated in FIG. 6C.
Figure 6E:
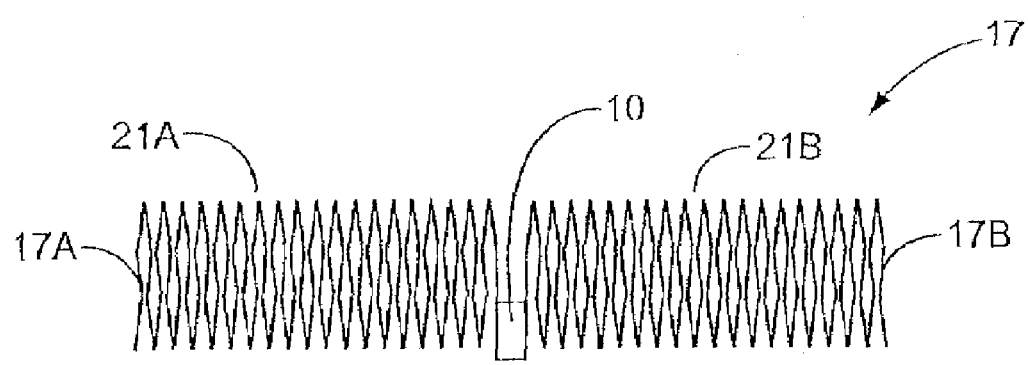
FIG. 6E is a schematic diagram of another embodiment of an pentagonal-shaped wave antenna and wireless communication device.

FIG. 6D illustrates an alternative embodiment of FIG. 6B, except that the wave antenna 17 is comprised of sections 21 that are octagonal-shaped like that illustrated in FIGS. 2C and 2D. All other aspects for the hexagonal-shaped wave antenna 17 embodiment discussed above and illustrated in FIG. 6B are equally applicable for this embodiment FIG. 6E illustrates an alternative embodiment of FIG. 6A except that the wave antenna 17 is comprised of sections 21 that are pentagonal-shaped like that illustrated in FIGS. 2E and 2F. All other aspects for the hexagonal-shaped wave antenna 17 embodiment discussed above and illustrated in FIG. 6A are equally applicable for this embodiment.

Figure 6F:
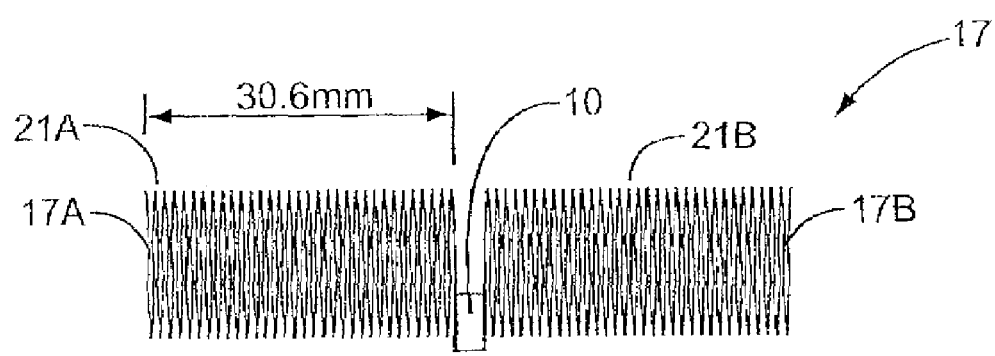
FIG. 6F is a schematic diagram of a compressed version of the pentagonal-shaped wave antenna illustrated in FIG. 6E.

FIG. 6F illustrates an alternative embodiment of FIG. 6B, except that the wave antenna 17 is comprised of sections 21 that are pentagonal shaped like that illustrated in FIGS. 2E and 2F. All other aspects for the hexagonal-shaped wave antenna 17 embodiment discussed above and illustrated in FIG. 6B are equally applicable for this embodiment.

Figure 6G:
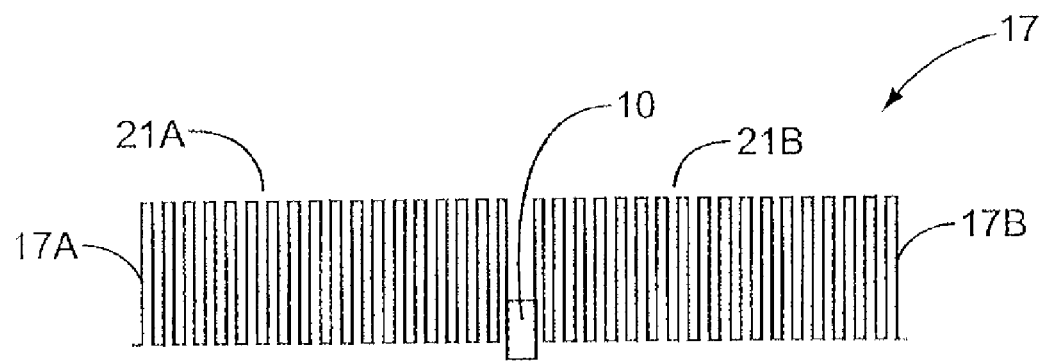
FIG. 6G is a schematic diagram of another embodiment of an square-shaped wave antenna and wireless communication device.
Figure 6H:
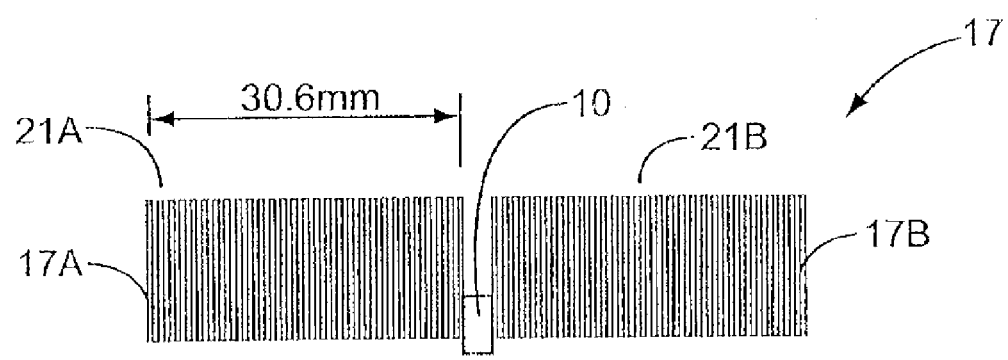
FIG. 6H is a schematic diagram of a compressed version of the square-shaped wave antenna illustrated in FIG. 6G.

FIG. 6G illustrates an alternative embodiment of FIG. 6A, except that the wave antenna 17 is comprised of sections 21 that are square-shaped like that illustrated in FIGS. 2G and 2H. All other aspects for the square-shaped wave antenna 17 embodiment discussed above and illustrated in FIG. 6A are equally applicable for this embodiment FIG. 6H illustrates an alternative embodiment of FIG. 6B, except that the wave antenna 17 is comprised of sections 21 that are square-shaped like that illustrated in FIGS. 2G and 2H. All other aspects for the hexagonal-shaped wave antenna 17 embodiment discussed above and illustrated in FIG. 6B are equally applicable for this embodiment.

Figure 6I:
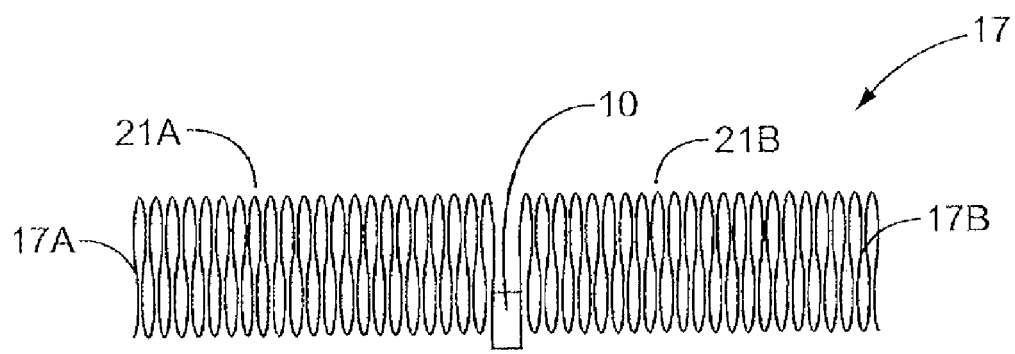
FIG. 6I is a schematic diagram of another embodiment of an elliptical curve-shaped wave antenna and wireless communication device.

FIG. 6I illustrates an alternative embodiment of FIG. 6A, except that the wave antenna 17 is comprised of sections 21 that are elliptical curve-shaped like that illustrated in FIGS. 2I and 2J. All other aspects for the square-shaped wave antenna 17 embodiment discussed above and illustrated in FIG. 6A are equally applicable for this embodiment.

Figure 6J:
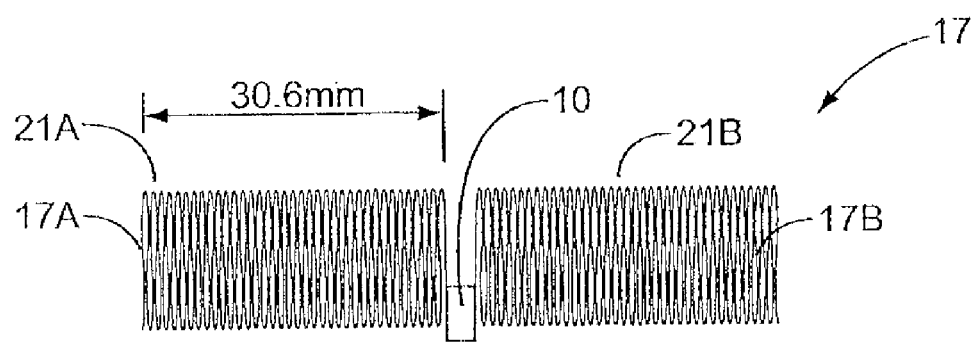
FIG. 6J is a schematic diagram of a compressed version of the elliptical curve-shaped wave antenna illustrated in FIG. 6I.

FIG. 6J illustrates an alternative embodiment of FIG. 6B, except that the wave antenna 17 is comprised of sections 21 that are elliptical curve-shaped like that illustrated in FIGS. 2I and 2J. All other aspects for the hexagonal-shaped wave antenna 17 embodiment discussed above and illustrated in FIG. 6B are equally applicable for this embodiment.

Figure 6K:
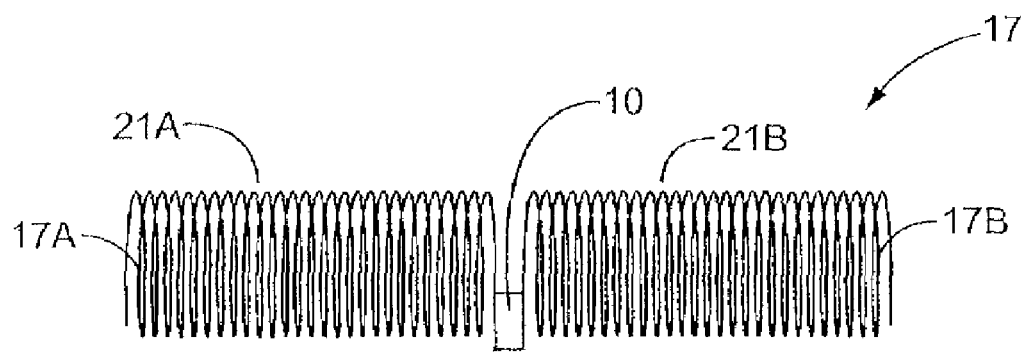
FIG. 6K is a schematic diagram of another embodiment of an coil-shaped wave antenna and wireless communication device.
Figure 6L:
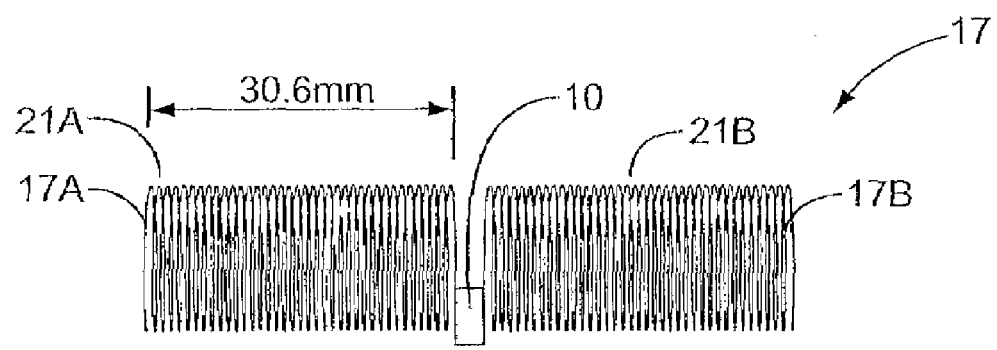
FIG. 6L is a schematic diagram of a compressed version of the coil-shaped wave antenna illustrated in FIG. 6K.

FIG. 6K illustrates an alternative embodiment of FIG. 6A, except that the wave antenna 17 is comprised of sections 21 that are coil-shaped like that illustrated in FIGS. 2K and 2L. All other aspects for the square-shaped wave antenna 17 embodiment discussed above and illustrated in FIG. 6A are equally applicable for this embodiment FIG. 6L illustrates an alternative embodiment of FIG. 6B, except that the wave antenna 17 is comprised of sections 21 that are coil-shaped like that illustrated in FIGS. 2K and 2L. All other aspects for the hexagonal-shaped wave antenna 17 embodiment discussed above and illustrated in FIG. 6B are equally applicable for this embodiment.

Figure 7A:
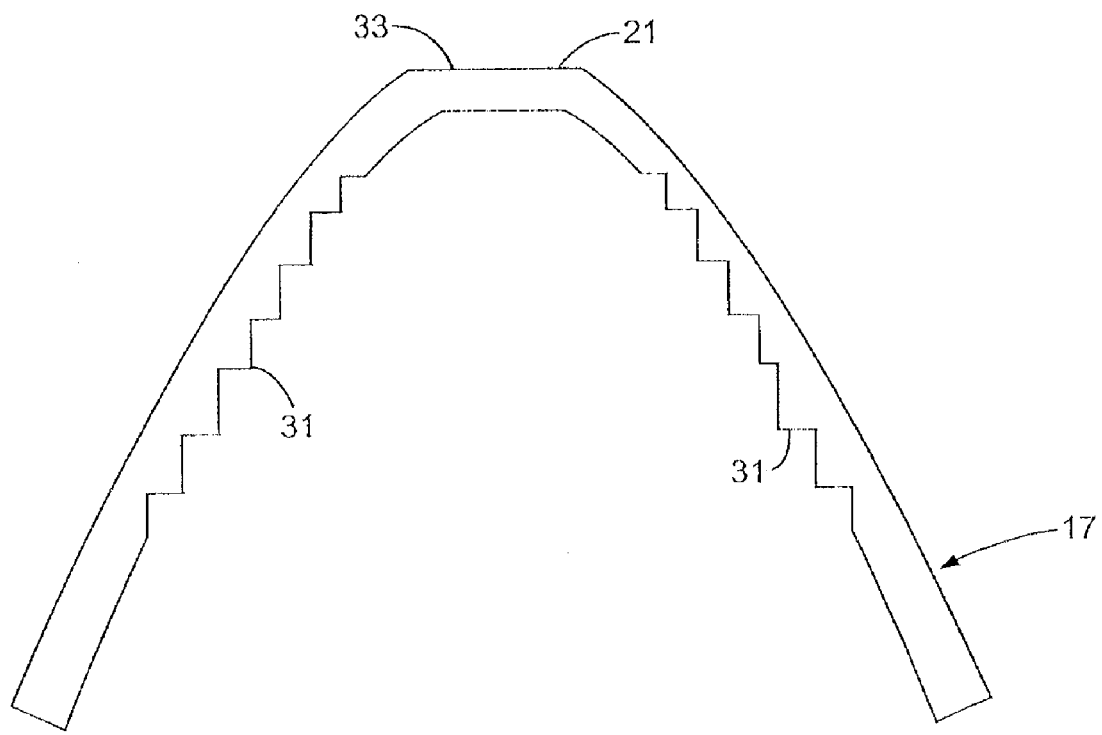
FIG. 7A is a schematic diagram of modifications to a curved section of the wave antenna to spread the bend angle of the conductive section over a larger linear length of the bend.

FIG. 7A illustrates an alternative embodiment of the conductive section 21 of the wave antenna 17 wherein the width of the section 21 is dynamically altered along the length of the shape of the section 21. This embodiment is useful for the polygonal-shaped wave antennas discussed above.

Figure 7B:
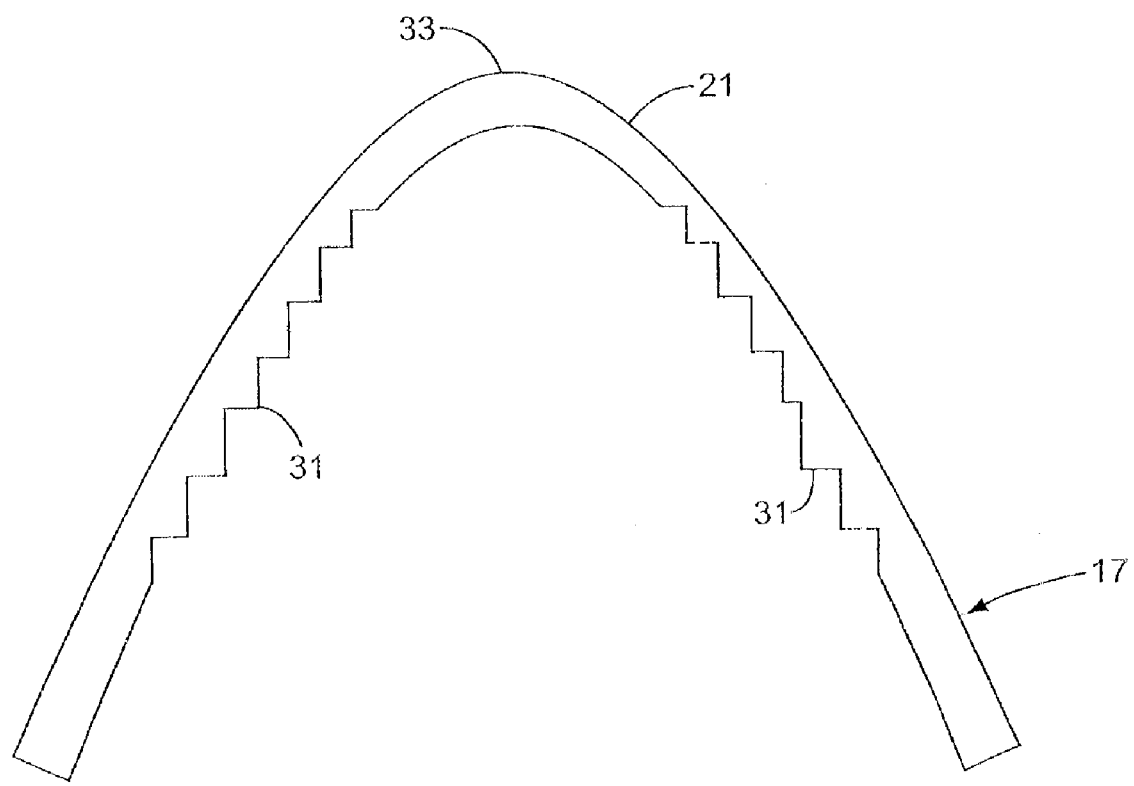
FIG. 7B is a schematic diagram of modifications to a section side of the wave antenna to spread the bend angle of the conductive section over a larger linear length of the bend.

FIG. 7B illustrates an alternative embodiment of FIG. 7A that is a conductive section 21 of the wave antenna 17 useful for a curve-shaped wave antenna 17, such as the elliptical-curve or coil shaped wave antennas 17 discussed above. This embodiment spreads the bending effect along the conductive section 21 so that the wave antenna 17 is less susceptible to breaking, just as the embodiment illustrated in FIG. 7A. The discussion above related to FIG. 7A is equally applicable for the embodiment illustrated in FIG. 7B.

Figure 8A:
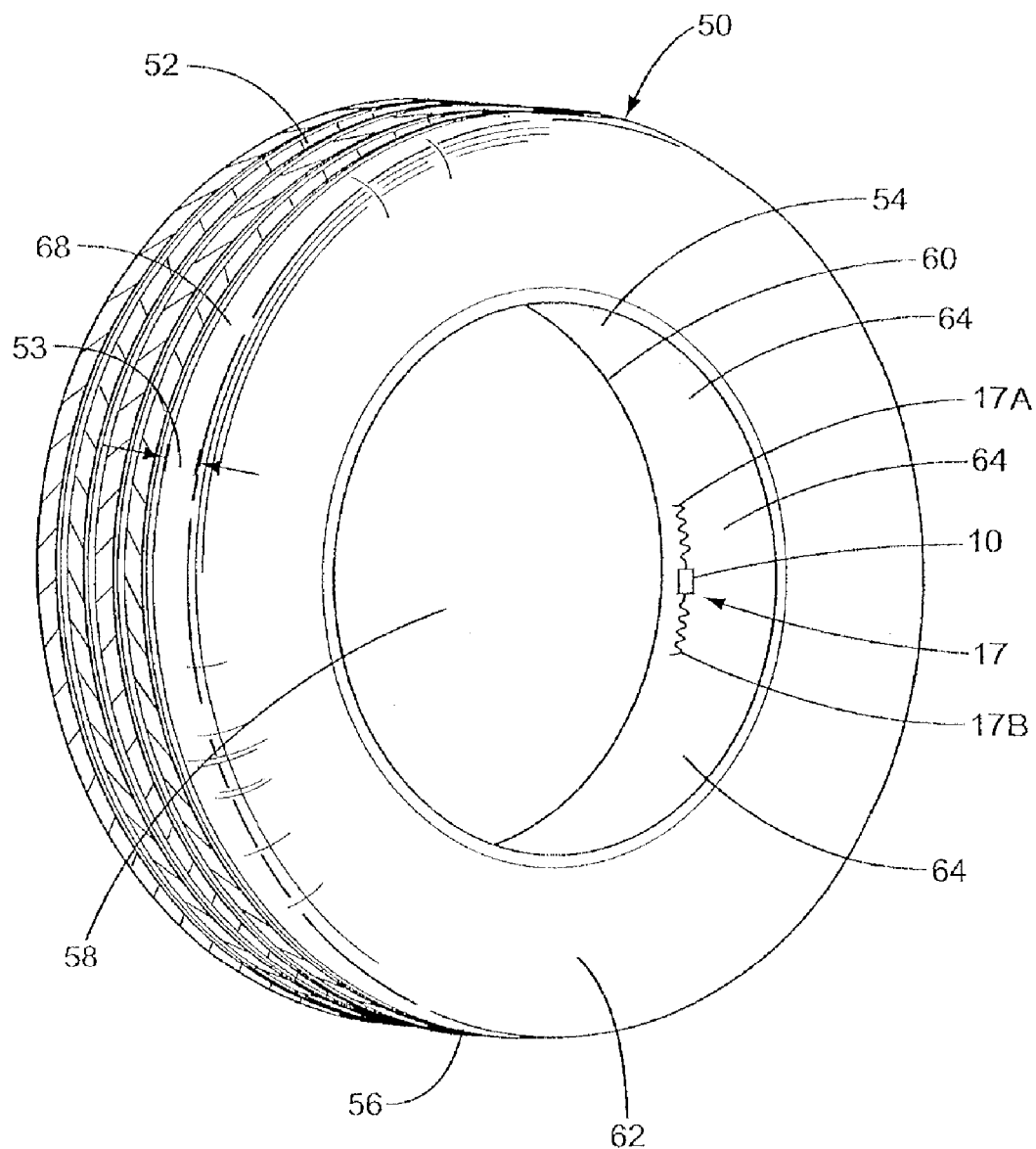
FIG. 8A is a schematic diagram of a wireless communication device and wave antenna attached to the inside of a tire for wireless communication of information about the tire.

FIG. 8A illustrates one type of article of manufacture that undergoes force during its manufacture and use and that may include a wireless communication device 10 and wave antenna 17 like that illustrated in FIGS. 6A–6L, or any of the previously discussed wave antennas 17. This embodiment includes a rubber tire 50 well known in the prior art that is used on transportation vehicles. The tire 50 is designed to be pressurized with air when mounted on a vehicle wheel forming a seal between the wheel and the tire 50. The tire 50 is comprised of a tread surface 52 that has a certain defined thickness 53. The tread surface 52 has a left outer side 54, a right outer side 56 and an orifice 58 in the center where the tire 50 is designed to fit on a wheel. The left outer side 54 and right outer side 56 are curved downward at angles substantially perpendicular to the plane of the tread surface 52 to form a left outer wall 60 and a right outer wall 62. When the left outer wall 60 and right outer wall 62 are formed, a left inner wall 64 and a right inner wall (not shown) on the inside of right outer wall 62 are also formed as well. Additionally, depending on the type of tire 50, a steel belt 68 may also be included inside the rubber of the tire 50 under the surface of the tread surface 52 for increased performance and life. More information on the construction and design of a typical tire 50 is disclosed in U.S. Pat. No. 5,554,242, entitled "Method for making a multi-component tire," incorporated herein by reference in its entirety.

In this embodiment, a wireless communication device 10 and dipole wave antenna 17 are attached on the inner surface of the tire 50 on the inner side of the tread surface 52. During the manufacturing of a tire 50, the rubber in the tire 50 undergoes a lamination process whereby the tire 50 may be stretched up to approximately 16 times its normal size and then shrunk back down to the normal dimensions of a wheel. If a wireless communication device 10 is placed inside the tire 50 during the manufacturing process, the wireless communication device 10 and antenna 17 must be able to withstand the stretching and shrinking that a tire 50 undergoes without being damaged. The wave antenna 17 of the present invention is particularly suited for this application since the wave antenna 17 can stretch and compress without damaging the conductor of the wave antenna 17.

Also, a tire 50 is inflated with a gas, such as air, to a pressure during its normal operation. If the wireless communication device 10 and antenna 17 are placed inside the tread surface 52 or inside the tire 50, the wireless communication device 10 and antenna 17 will stretch and compress depending on the pressure level in the tire 50. The more pressure contained in the tire 50, the more the tire 50 will stretch. Therefore, any wireless communication device 10 and antenna 17 that is contained inside the tire 50 or inside the rubber of the tire 50 must be able to withstand this stretching without being damaged and/or affecting the proper operation of the wireless communication device 10.

Figure 8B:
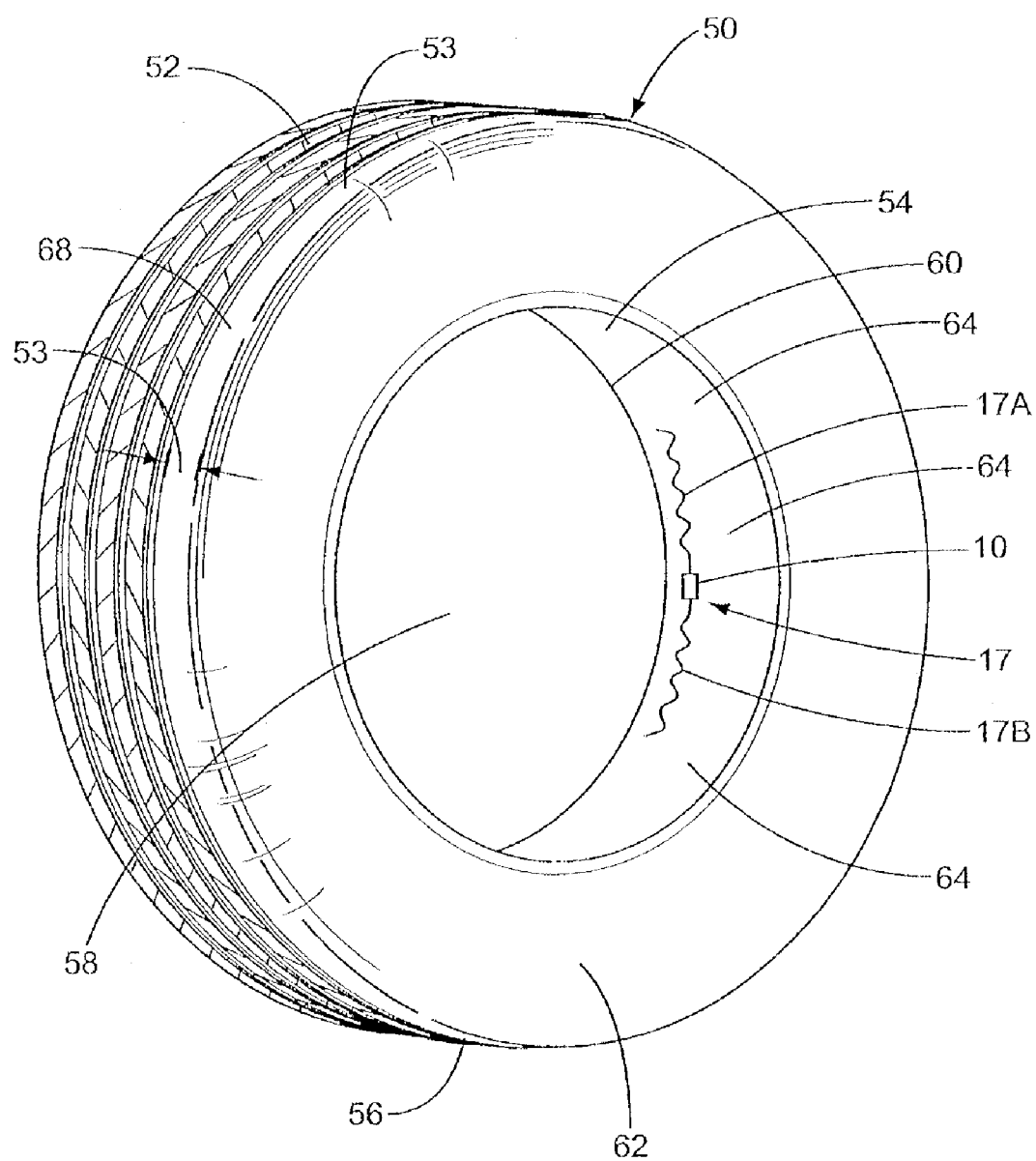
FIG. 8B is a schematic diagram of the wireless communication device and wave antenna of FIG. 8A, except that the tire is under pressure and is stretching the wave antenna.

FIG. 8B illustrates the same tire illustrated in FIG. 8A. However, in this embodiment, the tire 50 is under a pressure and has stretched the dipole wave antenna 17. Because the dipole wave antenna 17 is capable of stretching without being damaged or broken, the dipole wave antenna 17 is not damaged and does not break when the tire 50 is stretched when subjected to a pressure. Note that the wave antenna 17 placed inside the tire 50 could also be a monopole wave antenna 17, as illustrated in FIGS. 2A, 2C, 2E, 2G, 2I, and 2K or any other variation of the wave antenna 17, including the wave antennas 17 illustrated in FIGS. 2A–6L. Also, note that the wireless communication device 10 and wave antenna 17 could be provided anywhere on the inside of the tire 50, including inside the thickness 53 of the tread surface 52, the left inner wall 64 or the right inner wall (not shown) on the inside of right outer wall 62.

At a given frequency, the length of the wave antenna 17 for optimum coupling is affected by the electrical properties of the material surrounding, and in contact with, the conductive portions of the antenna 17. Since the rubber of the tire 50 may contain large amounts of "carbon black," a relatively conductive material, an insulating material having the necessary electrical properties, may be required to encapsulate the metal of the antenna 17 with a non-conductive coating (not shown) to insulate it from the rubber of the tire 50. In other cases the length of the antenna 17 elements must be tuned in length to match the electrical properties of the surrounding material, as is well known issue with antennas.

Note that the wave antenna 17 discussed above and illustrated in FIGS. 8A and 8B may be any of the shapes discussed above and illustrated in FIGS. 2A–6L, including polygonal, elliptical curve and coil-shaped.

Figure 9:
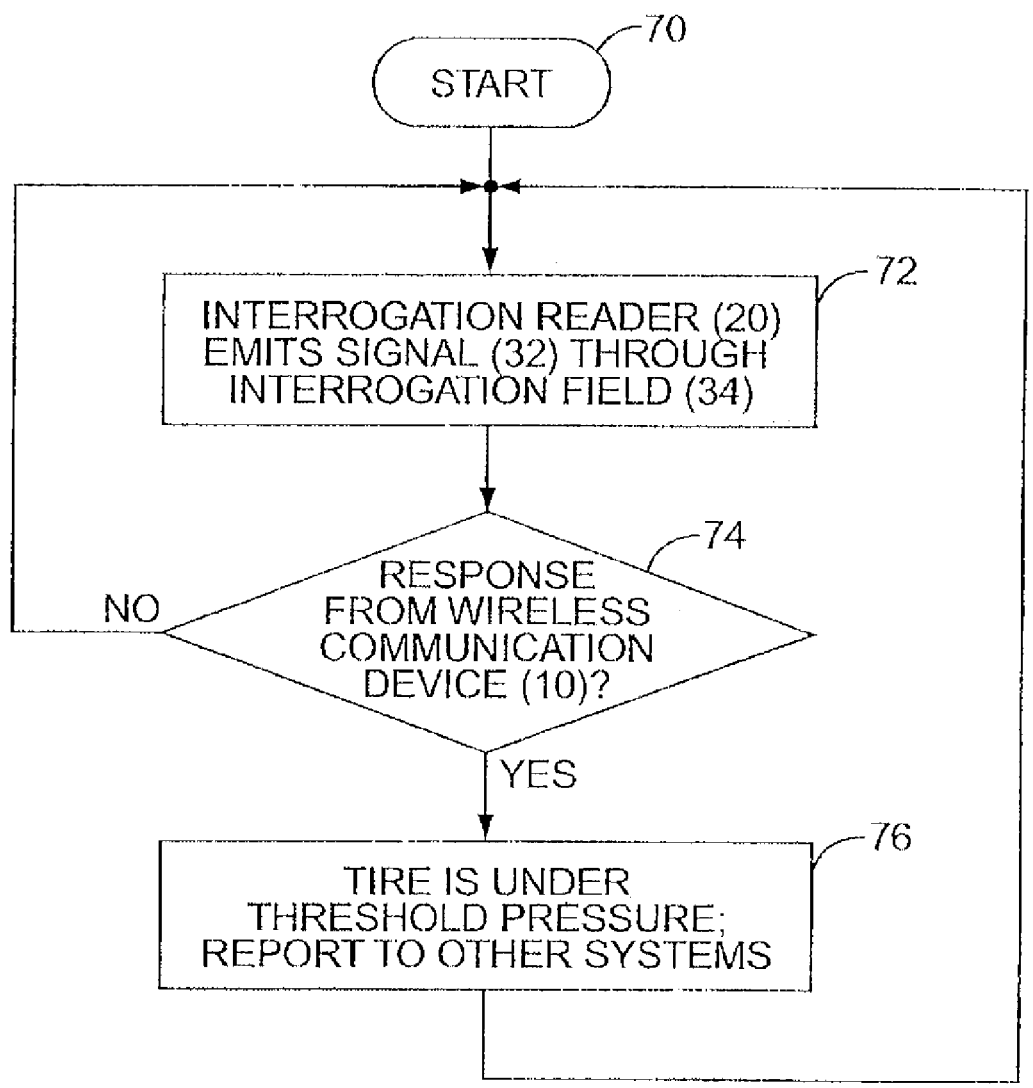
FIG. 9 is a flowchart diagram of a tire pressure detection system executed by an interrogation reader by communicating with a wireless communication device coupled to a wave antenna inside a tire like that illustrated in FIGS. 8A and 8B.

FIG. 9 illustrates a flowchart process wherein the interrogation reader 20 is designed to communicate with the wireless communication device 10 and wave antenna 17 to determine when the pressure of the tire 50 has reached a certain designated threshold pressure. Because a wave antenna 17 changes length based on the force exerted on its conductors, a wave antenna 17 will stretch if placed inside a tire 50 as the pressure inside the tire 50 rises. The wave antenna 17 can be designed so that the length of the wave antenna 17 only reaches a certain designated length to be capable of receiving signals at the operating frequency of the interrogation reader 20 when the tire 50 reaches a certain designated threshold pressure.

The process starts (block 70), and the interrogation reader 20 emits a signal 32 through the field 34 as discussed previously for operation of the interrogation reader 20 and wireless communication device 10 illustrated in FIG. 1. The interrogation reader 20 checks to see if a response communication has been received from the wireless communication device 10 (decision 74). If no response signal is received by the interrogation reader 20 from the wireless communication device 10, the interrogation reader 20 continues to emit the signal 32 through field 34 in a looping fashion (block 72) until a response is received. Once a response is received by the interrogation reader 20 from the wireless communication device 10 (decision 74), this is indicative of the fact that the wave antenna 17 coupled to the wireless communication device 10 has stretched to a certain length so that the wave antenna's 17 operating frequency is compatible with the operating frequency of the interrogation reader 20 (block 76). The interrogation reader 20 can report that the tire 50 containing the wireless communication device 10 and wave antenna 17 has reached a certain threshold pressure Note that the wave antennas 17 may be any of the wave antennas 17 illustrated in FIGS. 2A–6L.

Figure 10:
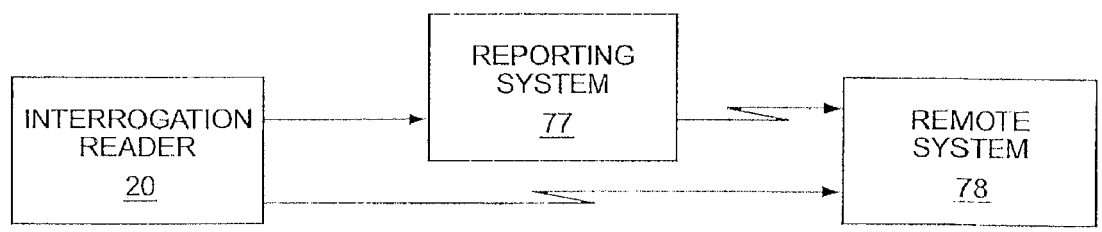
FIG. 10 is a schematic diagram of a reporting system for information wirelessly communicated from a tire to an interrogation reader.

FIG. 10 illustrates one embodiment of a reporting system 77 that may be provided for the interrogation reader 20. The interrogation reader 20 may be coupled to a reporting system 77. This reporting system 77 may be located in close proximity to the interrogation reader 20, and may be coupled to the interrogation reader 20 by either a wired or wireless connection. The reporting system 77 may be a user interface or other computer system that is capable of receiving and/or storing data communications received from an interrogation reader 20. This information may be any type of information received from a wireless communication device 10, including but not limited to identification information, tracking information, and/or environmental information concerning the wireless communication device 10 and/or its surroundings, such as pressure and temperature. The information may be used for any purpose. For example, identification, tracking, temperature, force and/or pressure information concerning a tire 50 during its manufacture may be communicated to the reporting system 77 which may then be used for tracking, quality control, and supply-chain management. If the information received by the reporting system is not normal or proper, the reporting system 77 may control the manufacturing operations to stop and/or change processes during manufacture and/or alert personnel in charge of the manufacturing process.

The reporting system 77 may also communicate information received from the wireless communication device 10, via the interrogation reader 20, to a remote system 78 located remotely from the reporting system 77 and/or the interrogation reader 20. The communication between the reporting system 77 and the remote system 78 may be through wired communication, wireless communication, modem communication or other networking communication, such as the Internet. Alternatively, the interrogation reader 20 may communicate the information received from the wireless communication device 10 directly to the remote system 78 rather than first reporting the information through the reporting system 77 using the same or similar communication mediums as may be used between the reporting system 77 and the remote system 78.

Figure 11:
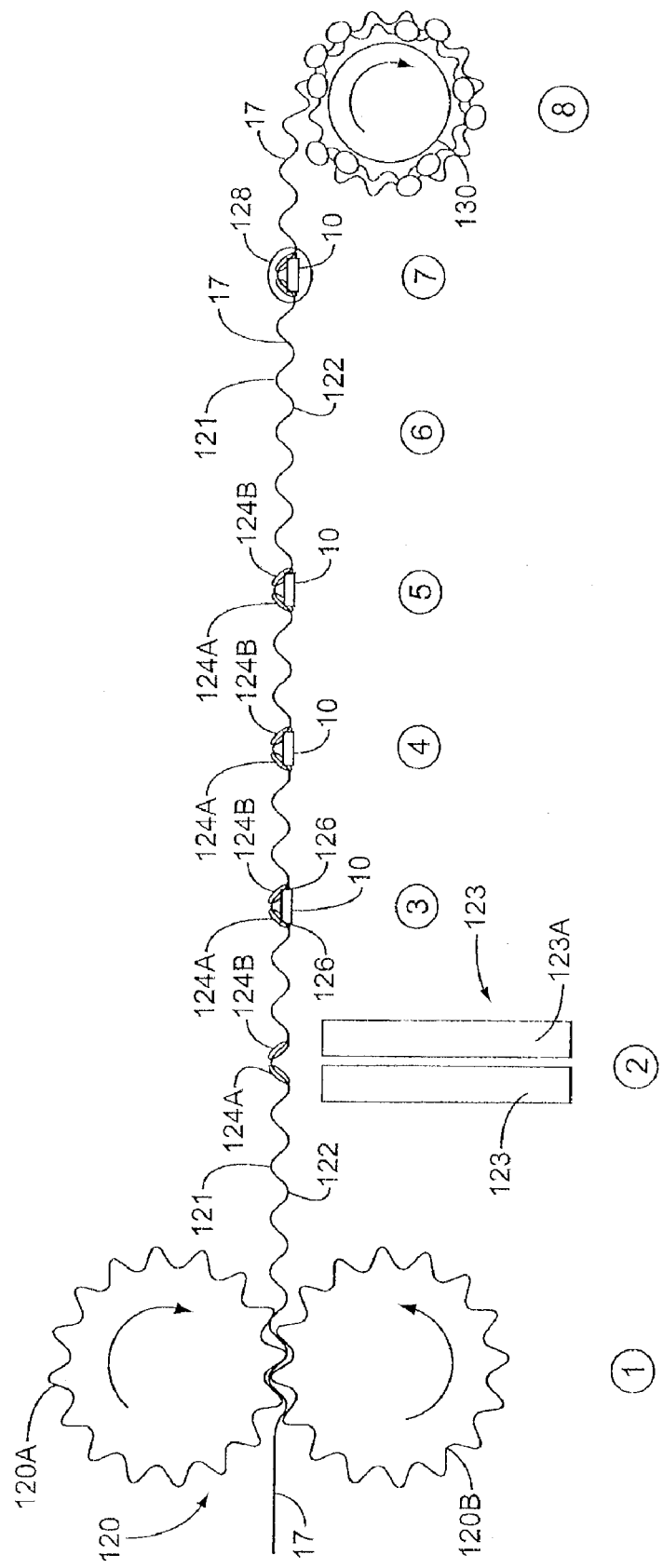
FIG. 11 is a schematic diagram of a process of manufacturing a wave antenna and coupling the wave antenna to a wireless communication device.

FIG. 11 illustrates a method of manufacturing a wave antenna 17 and assembling of the wave antenna 17 to wireless communication devices 10 for any type of wave antenna 17 illustrated in FIG. 2A–6L and discussed above The process involves eight total steps Each of the steps is labeled in circled numbers illustrated in FIG. 11. The first step of the process involves passing an antenna 17 conductor wire or foil through cogs 120 to create the alternating curves in the antenna conductor 17 to form the wave antenna 17. The cogs 120 are comprised of a top cog 120A and a bottom cog 120B. The top cog 120A rotates clockwise, and the bottom cog 120B rotates counterclockwise Each cog 120A, 120B has a periphery such that each of the cogs 120A, 120B interlock with each other as they rotate. The cogs 120A, 120B are shaped to create the desired wave antenna 17 shape As the antenna conductor 17 passes through the cogs 120A, 120B, alternating curves are placed in the antenna conductor 17 to form peaks 121 and valleys 122 in the antenna conductor 17 to form the wave antenna 17

The second step of the process involves placing tin solder on portions of the wave antenna 17 so that a wireless communication device 10 can be soldered and attached to the wave antenna 17 in a later step. A soldering station 123 is provided and is comprised of a first tinning position 123A and a second tinning position 123B. For every predefined portion of the wave antenna 17 that passes by the soldering station 123, the first tinning position 123A and second tinning position 123B raise upward to place tin solder on the left side of the peak 124A and an adjacent right side of the peak 124B so that the wireless communication device 10 can be soldered to the wave antenna 17 in the third step of the process Please note that the process may also use glue, induction welding, or other suitable adhesive, instead of solder, to attach the wireless communication device 10 to the wave antenna 17.

The third step of the process involves attaching a wireless communication device 10 to the wave antenna 17. A wireless communication device is attached to the left side of the peak 124A and the right side of the peak 124B at the points of the tin solder. An adhesive 126 is used to attach the leads or pins (not shown) of the wireless communication device 10 to the tin solder, and solder paste is added to the points where the wireless communication device 10 attaches to the tin solder on the wave antenna 17 to conductively attach the wireless communication device 10 to the wave antenna 17. Note that when the wireless communication device 10 is attached to the wave antenna 17, the peak remains on the wireless communication device 10 that causes a short 128 between the two input ports (not shown) of the wireless communication device 10 and the two wave antennas 17 coupled to the wireless communication device 10

The fourth step in the process involves passing the wireless communication device 10 as connected to the wave antenna 17 through a hot gas re-flow soldering process well known to one of ordinary skill in the art to securely attach the solder between the leads of the wireless communication device 10 and the wave antenna 17

The fifth step in the process involves the well-known process of cleaning away any excess solder that is unused and left over during the previous soldering.

The sixth step in the process involves removing the short 128 between the two wave antennas 17 left by the peak 124 of the wave antenna 17 from the third step in the process. Depending on the type of wireless communication device 10 and its design, the short 128 may or may not cause the wireless communication device 10 to not properly operate to receive signals and re-modulate response signals. If the wireless communication device 10 operation is not affected by this short 128, this step can be skipped in the process The seventh step in the process involves encapsulating the wireless communication device 10. The wireless communication device 10 is typically in the form of an RF integrated circuit chip that is encapsulated within a hardened, non-conductive material, such as a plastic or epoxy, to protect the inside components of the chip from the environment. An additional encapsulating material, such as epoxy, may also be added over the bonding points of the wireless communication device 10 to the wave antenna 17 to add additional mechanical strain relief.

The eighth and last step involves winding wireless communication devices 10 as attached on the wave antenna 17 onto a reel 130. The wireless communication devices 10 and wave antenna 17 are contained on a strip since the wave antenna 17 conductor has not been yet cut. When it is desired to apply the wireless communication device 10 and attached wave antenna 17 to a good, object, or article of manufacture, such as a tire 50, the wireless communication device 10 and attached wave antenna 17 can be unwound from the reel 130 and the wave antenna 17 conductor cut in the middle between two consecutive wireless communication devices 10 to form separate wireless communication devices 10 and dipole wave antennas 17.

Please note that there are other methods of manufacturing the wave antenna 17 including using a computer numerical controller (CNC) machine. The manufacturing process may be like that of used for making springs. Also note that the wave antenna 17 discussed above and illustrated in FIG. 11 may be for any shaped wave antenna 17 previously discussed.

Figure 12:
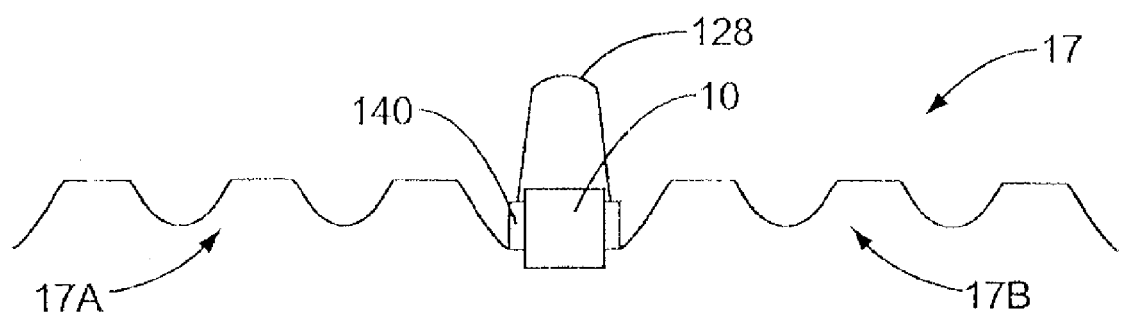
FIG. 12 is a schematic diagram of an inductance tuning short provided by the manufacturing process illustrated in FIG. 11.

FIG. 12 illustrates the short 128 left on the wireless communication device 10 and polygonal-shaped wave antenna 17 as a tuning inductance. Some UHF wireless communication devices 10 operate best when a direct current (DC) short, in the form of a tuning inductance, is present across the wireless communication device 10 and, therefore, the process of removing the short 128 can be omitted. FIG. 12A illustrates an alternative embodiment of the polygonal-shaped wave antenna 17 and wireless communication device 10 where an uneven cog 120 has been used in step 1 of the process illustrated in FIG. 11 to produce an extended loop short 128 across the wireless communication device 10. This gives the required amount of inductance for best operation of the wireless communication device 10 as the wave antenna 17 and the short 128 are in parallel Note that the embodiment illustrated in FIG. 12 and discussed above may also be implemented with any polygonal, elliptical-curve, or coil-shaped wave antenna 17, including the polygonal, elliptical-curve, and coil-shaped wave antennas 17 discussed above and illustrated in FIGS. 2A–6L.

The embodiments set forth above represent the necessary information to enable those skilled in the art to practice the invention and illustrate the best mode of practicing the invention. Upon reading the preceding description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

It should be understood that the present invention is not limited to applications involving a vehicle tire. It should also be understood that the present invention is not limited to any particular type of component, including but not limited to the wireless communication device 10 and its components, the wave antenna 17, the interrogation reader 20 and its components, the pressure sensor 18, the temperature sensor 19, the resonating ring 40, the tire 50 and its components, the reporting system 77, the remote system 78, the wheel 100 and its components, the cogs 120, the soldering station 123, and the adhesive 124. For the purposes of this application, couple, coupled, or coupling is defined as either a direct connection or a reactive coupling. Reactive coupling is defined as either capacitive or inductive coupling. The wave antenna 17 discussed in this application may be polygonal, elliptical-curve, or coil-shaped.

Those skilled in the art will recognize improvements and modifications to the preferred embodiments of the present invention. All such improvements and modifications are considered within the scope of the concepts disclosed herein and the claims that follow

What is claimed is:

1. A method of manufacturing a polygonal-shaped wave antenna, comprising the steps of:

passing a conducting material through a first cog and a second cog each having a polygonal-shaped periphery and placed in proximity to each other, wherein said polygonal-shaped peripheries of said first and second cogs substantially interlock with each other as said first and second cogs rotate; and placing alternating segments in said conducting material when said conducting material is passed through said first and second cogs.

2. The method of claim 1, wherein said polygonal-shape is comprised from a group consisting of a square, a pentagon, a hexagon, a heptagon, an octagon, a nonagon, and a decagon.

3. A method of manufacturing a wireless communication device that is coupled to a polygonal-shaped wave antenna, comprising the steps of:

passing a conducting material through a first cog and a second cog each having a polygonal-shaped periphery and placed in proximity to each other, wherein said first and second cogs substantially interlock with each other as said first and second cogs rotate;

placing alternating segments in said conducting material when said conducting material passes through said first and second cogs to form a conducting material having a plurality of segments that form a plurality of peaks separated by valleys; and electrically connecting wireless communication device across opposing sides of one of said plurality of peaks.

4. The method of claim 3, wherein said electrically connecting a wireless communication device comprises soldering, the method further comprising:
re-flow soldering said wireless communication device with hot gas after said soldering.

5. The method of claim 3, wherein said polygonal-shape is comprised from a group consisting of a square, a pentagon, a hexagon, a heptagon, an octagon, a nonagon, and a decagon.

6. The method of claim 3, wherein said electrically connecting a wireless communication device comprises soldering, the method further comprising cleaning away excess solder after said soldering.

7. The method of claim 3, further comprising removing a short formed across said wireless communication device by said one of said plurality of peaks.

8. The method of claim 3, wherein said electrically connecting a wireless communication device comprises soldering, the method further comprising tinning each side of said one of said plurality of peaks before said soldering.

9. The method of claim 8, further comprising:
re-flow soldering said wireless communication device with hot gas; cleaning away excess solder; and
removing a short formed across said wireless communication device by said one of said plurality of peaks;
wherein said re-flow soldering, cleaning away, and removing a short are performed after said soldering.

10. The method of claim 3, further comprising encapsulating said wireless communication device after said wireless communication device has been electrically connected to said one of said plurality of peaks.

11. The method of claim 3, further comprising electrically connecting multiple wireless communication devices to said conducting material, each said wireless communication device being individually connected across the sides of a peak in said conducting material.

12. The method of claim 11, further comprising winding said conducting material with said wireless communication devices connected thereto onto a reel.

13. The method of claim 12, further comprising cutting said conducting material between said wireless communication devices to separate the wireless communication devices.

14. A method of manufacturing an elliptical curve-shaped wave antenna, comprising:
passing a conducting material through a first cog and a second cog each having an elliptical curve-shaped periphery and placed in proximity to each other, wherein said elliptical curve-shaped peripheries of said first and second cogs substantially interlock with each other as said first and second cogs rotate; and
placing alternating curves in said conducting material when said conducting material is passed through said first and second cogs.

15. A method of manufacturing a wireless communication device that is coupled to an elliptical curve-shaped wave antenna, comprising:
passing a conducting material through a first cog and a second cog each having an elliptical curve-shaped periphery and placed in proximity to each other, wherein each of said first and second cogs substantially interlock with each other as said first and second cogs rotate;
placing alternating curves in said conducting material when said conducting material passes through said first and second cogs to form a conducting material having a plurality of curves that form a plurality of peaks separated by valleys; and
electrically connecting a wireless communication device across apposing sides of one of said plurality of peaks.

16. The method of claim 15, wherein said electrically connecting a wireless communication device comprises soldering, the method further comprising:
re-flow soldering said wireless communication device with hot gas after said soldering.

17. The method of claim 15, wherein said electrically connecting a wireless communication device comprises soldering, the method further comprising cleaning away excess solder after said soldering.

18. The method of claim 15, further comprising removing a short formed across said wireless communication device by said one of said plurality of peaks.

19. The method of claim 15, wherein said electrically connecting a wireless communication device comprises soldering, the method further comprising tinning each side of said one of said plurality of peaks before said soldering.

20. The method of claim 19, further comprising:
re-flow soldering said wireless communication device with hot gas;
cleaning away excess solder; and
removing a short formed across said wireless communication device by said one of said plurality of peaks;
wherein said re-flow soldering, cleaning away, and removing a short are performed after said soldering.

21. The method of claim 15, further comprising encapsulating said wireless communication device after said wireless communication device has been electrically connected to said one of said plurality of peaks.

22. The method of claim 15, further comprising electrically connecting multiple wireless communication devices to said conducting material, each said wireless communication device being individually connected across the sides of a peak in said conducting material.

23. The method of claim 22, further comprising winding said conducting material with said wireless communication devices connected thereto onto a reel.

24. The method of claim 23, further comprising cutting said conducting material between said wireless communication devices to separate the wireless communication devices.

25. A method of manufacturing a coil-shaped wave antenna, comprising:
passing a conducting material through a first cog and a second cog each having a coil-shaped periphery and placed in proximity to each other wherein said coil-shaped periphery in each of said first and second cogs substantially interlock with each other as said first and second cogs rotate; and
placing alternating curves in said conducting material when said conducting material is passed through said first and second cogs.

26. A method of manufacturing a wireless communication device that is coupled to a coil-shaped wave antenna, comprising:
passing a conducting material through a first cog and a second cog each having coil-shaped periphery and placed in proximity to each other, wherein each of said first and second cogs substantially interlock with each other as said first and second cogs rotate;
placing alternating curves in said conducting material when said conducting material is passes through said first and second cogs to form a conducting material having a plurality of curves that form a plurality of peaks separated by valleys; and electrically connecting a wireless communication device across opposing sides of one of said plurality of peaks.

27. The method of claim 25, wherein said electrically connecting a wireless communication device comprises soldering, the method further comprising:

re-flow soldering said wireless communication device with hot gas after said soldering.

28. The method of claim 26, wherein said electrically connecting a wireless communication device comprises soldering, the method further comprising cleaning away excess solder after said soldering.

29. The method of claim 26, further comprising removing a short formed across said wireless communication device by said one of said plurality of peaks.

30. The method of claim 26, wherein said electrically connecting a wireless communication device comprises soldering, the method further comprising tinning each side of said one of said plurality of peaks before said soldering.

31. The method of claim 30, further comprising:

re-flow soldering said wireless communication device with hot gas;

cleaning away excess solder; and removing a short formed across said wireless communication device by said one of said plurality of peaks;

wherein said re-flow soldering, cleaning away, and removing a short are performed after said soldering.

32. The method of claim 26, further comprising encapsulating said wireless communication device after said wireless communication device has been electrically connected to said one of said plurality of peaks.

33. The method of claim 26, further comprising electrically connecting multiple wireless communication devices to said conducting material, each said wireless communication device being individually connected across the sides of a peak in said conducting material.

34. The method of claim 33, further comprising winding said conducting material with said wireless communication devices connected thereto onto a reel.

35. The method of claim 34, further comprising cutting said conducting material between said wireless communication devices to separate the wireless communication devices.

* * * * *

UNITED STATES PATENT AND TRADEMARK OFFICE
CERTIFICATE OF CORRECTION

PATENT NO. : 7,373,713 B2
APPLICATION NO. : 11/468750
DATED : May 20, 2008
INVENTOR(S) : I. J. Forster et al.

Page 1 of 1

It is certified that error appears in the above-identified patent and that said Letters Patent is hereby corrected as shown below:

| COLUMN | LINE | ERROR |
|---|---|---|
| 26 | 66 | after "electrically connecting" insert --a-- |
| 27 | 24 | after "with hot gas;" insert a new paragraph |
| 28 | 5 | "across apposing" should read --across opposing-- |
| 28 | 50 | after "in proximity to each other" insert --,-- |
| 29 | 5 | "method of claim 25," should read --method of claim 26,-- |

Signed and Sealed this

Sixteenth Day of June, 2009

JOHN DOLL
*Acting Director of the United States Patent and Trademark Office*